(12) United States Patent
Ida et al.

(10) Patent No.: US 6,208,607 B1
(45) Date of Patent: Mar. 27, 2001

(54) DISK LOADING APPARATUS WITH INTERLOCKED SHUTTER MECHANISM, ELEVATOR MECHANISM AND EJECT MECHANISM

(75) Inventors: Mitsuru Ida, Saitama; Koichi Numata, Tokyo; Taizo Ogawa, Kanagawa, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/294,845

(22) Filed: Apr. 20, 1999

(30) Foreign Application Priority Data

Apr. 28, 1998 (JP) .................................................. 10-118786

(51) Int. Cl.⁷ .................................................. G11B 33/02
(52) U.S. Cl. ............................................................ 369/77.1
(58) Field of Search ................................. 369/75.1, 77.1, 369/77.2, 270, 271

(56) References Cited

U.S. PATENT DOCUMENTS

| | | | |
|---|---|---|---|
| 4,521,819 | * 6/1985 | Elsing et al. | 360/98.05 |
| 4,562,498 | * 12/1985 | Shibata | 360/99.02 |
| 5,119,357 | * 6/1992 | Tsuruta et al. | 369/75.2 |
| 5,689,490 | * 11/1997 | Pollard | 369/77.2 |
| 5,691,860 | * 11/1997 | Hoppe | 360/97.02 |
| 5,787,063 | * 7/1998 | Kanno et al. | 369/77.2 |

FOREIGN PATENT DOCUMENTS

| | | | |
|---|---|---|---|
| 0572065 A2 | * 12/1993 | (EP) . | |
| 53-149010 | * 12/1978 | (JP) . | |
| 57-66565 | * 4/1982 | (JP) . | |
| 60-55547 | * 3/1985 | (JP) . | |
| 110365 | * 5/1986 | (JP) . | |

* cited by examiner

Primary Examiner—David Davis
Assistant Examiner—Julie Anne Watko
(74) Attorney, Agent, or Firm—Limbach & Limbach L.L.P.

(57) ABSTRACT

A recording and/or reproducing apparatus of a disc-shaped recording medium includes a main body portion, a shutter mechanism, a drive mechanism, an elevation mechanism and an eject mechanism. The main body portion has an opening portion through which a disc-shaped recording medium is inserted or ejected. The shutter mechanism opens and closes the opening portion. The shutter mechanism is provided on the main body portion to be freely movable and closes the opening portion under a state that the disc-shaped recording medium is completely inserted into the main body portion. The drive mechanism rotatably drivers the disc-shaped recording medium. The elevator mechanism is moved up and down in an interlocking manner with a movement of the shutter mechanism. The elevator mechanism mounts the recording medium on the drive mechanism when the shutter mechanism is moved to a position to close the opening portion, while makes the disc-shaped recording medium apart from the drive mechanism when the shutter mechanism is moved to a position to open said opening portion. The eject mechanism ejects the recording medium from the opening portion. The eject mechanism ejects the disc-shaped recording medium made apart from the drive mechanism by the elevator mechanism from the opening portion when the shutter mechanism is moved from the position to close the opening portion to the portion to open the opening portion.

21 Claims, 31 Drawing Sheets

DISK LOADING APPARATUS WITH INTERLOCKED SHUTTER MECHANISM, ELEVATOR MECHANISM AND EJECT MECHANISM

BACKGROUND OF THE INVENTION

1. Field of the Invention

The present invention relates to a recording and/or reproducing apparatus, and particularly to a recording and/or reproducing apparatus which has an opening portion and a shutter opening and closing the opening portion.

2. Description of the Related Art

In a portable disk recording and/or reproducing apparatus, for example, a disk player such as a CD (compact disk) player or the like, the main body portion includes a main portion where a disk mounting portion and an optical pickup are located, and a cover portion for rotating with respect to the main portion for opening and closing the disk mounting portion. In such a disk player, a CD is mounted on and dismounted from the disk mounting portion in such a state that the cover portion is largely opened relative to the main portion.

In the disk player as described above, it was impossible to mount/dismount a CD on/from the disk mounting portion without using both hands due to problems of the dimension of disk diameter and of the rotary angle of cover portion of the player. In such a state that the cover portion is open, the strength becomes weak. If the cover portion is left open it may be damaged accidentally. If the cover portion is left open in the above-mentioned disk player, trash or dust enters. This results in a problem that an optical pickup is made dirty and the movement of a mechanical portion is hampered.

SUMMARY OF THE INVENTION

It is therefore an object of the present invention to provide a recording and/or reproducing apparatus which resolves the above-mentioned problems.

According to the present invention, there is provided a recording and/or reproducing apparatus including a main body portion, a shutter mechanism, a driving mechanism, an elevator mechanism, and an ejection mechanism. The main body portion has an opening portion through which a recording medium is inserted and ejected. The shutter mechanism opens and closes the opening portion. The shutter mechanism is provided on the main body portion to be freely movable and closes the opening portion under a state where the insertion of the recording medium into the main body portion is completed. The driving mechanism drives the recording medium. The elevator mechanism moves up and down in an interlinking marker with the movement of the shutter mechanism. The elevator mechanism mounts the recording medium on the driving mechanism when the shutter mechanism is moved to a position to close the opening portion, while moving the recording medium apart from the driving mechanism when the shutter mechanism is moved to a position to open the opening portion. The ejector mechanism ejects the recording medium through the opening portion. When the shutter mechanism is moved from the position to close the opening portion to the position to open the opening portion, the ejector mechanism ejects the recording medium, which is moved apart from the driving mechanism by the elevator mechanism from the main body portion.

According to the present invention, there is provided a recording and/or reproducing apparatus of a disc-shape recording medium including a main body portion, a shutter mechanism, a driving mechanism, an elevator mechanism, and an ejector mechanism. The main body portion has an opening portion through which a disc-shaped recording medium is inserted or ejected. The shutter mechanism opens and closes the opening portion. The shutter mechanism is provided on the main portion to be freely movable and closes the opening portion at a state that the insertion of the disc-shaped recording medium into the main body portion is completed. The driving mechanism is a driving mechanism rotatably drives the disc-shaped recording medium and includes a motor to rotatably drive a table on which the disc-shaped recording medium is to be mounted and a disc table. The elevator mechanism goes up and down in an interlocking fashion with the movement of the shutter mechanism. The elevator mechanism goes down to a position lower than that of the disc table to mount the disc-shaped recording medium on the disc table when the shutter mechanism is moved to a position to close the opening portion, and lifts up the disc-shaped recording medium from the disc table when the shutter mechanism is moved to a position to open the opening portion. The ejector mechanism ejects the disc-shaped recording medium through the opening portion. The ejector mechanism ejects the disc-shaped recording medium lifted up from the disc table by the elevator mechanism when the shutter mechanism is moved from a position to close the opening portion to a position to open the opening portion.

According to the present invention, there is provided a recording and/or reproducing apparatus including a main body portion, a shutter mechanism, a driving mechanism, an elevator mechanism, and an ejector mechanism. The main body portion has an opening portion through which a recording medium is inserted or ejected. The opening portion is provided through the side surface of the main body portion. The shutter mechanism opens and closes the opening portion. The shutter mechanism is provided to be freely movable along the side surface of the main body portion and closes the opening portion under the state that the insertion of the recording medium into the main body portion is ended. The shutter mechanism moves at least two shutter members or a pair of shutter members between a position to open the opening portion and a position to close the opening portion. When the pair of the shutter members are moved in the opposite directions with each other, the opening portion is opened, when they are moved in the direction in which they become closer, the opening portion is closed. The driving mechanism drives the recording medium. The elevator mechanism goes up and down in an interlocking fashion with the movement of the shutter members. The elevator mechanism mounts the recording medium on the driving mechanism when the shutter members are moved to a position to open the opening portion, and moves the recording medium apart from the driving mechanism when the shutter members are moved to a position to open the opening portion. The ejector mechanism ejects the recording medium from the opening portion. The ejector mechanism ejects the recording medium moved apart from the driving mechanism by the elevator mechanism through the opening portion when the shutter members are moved from a position to close the opening portion to a position to open the opening portion.

DESCRIPTION OF THE PREFERRED EMBODIMENTS

Figure 1:
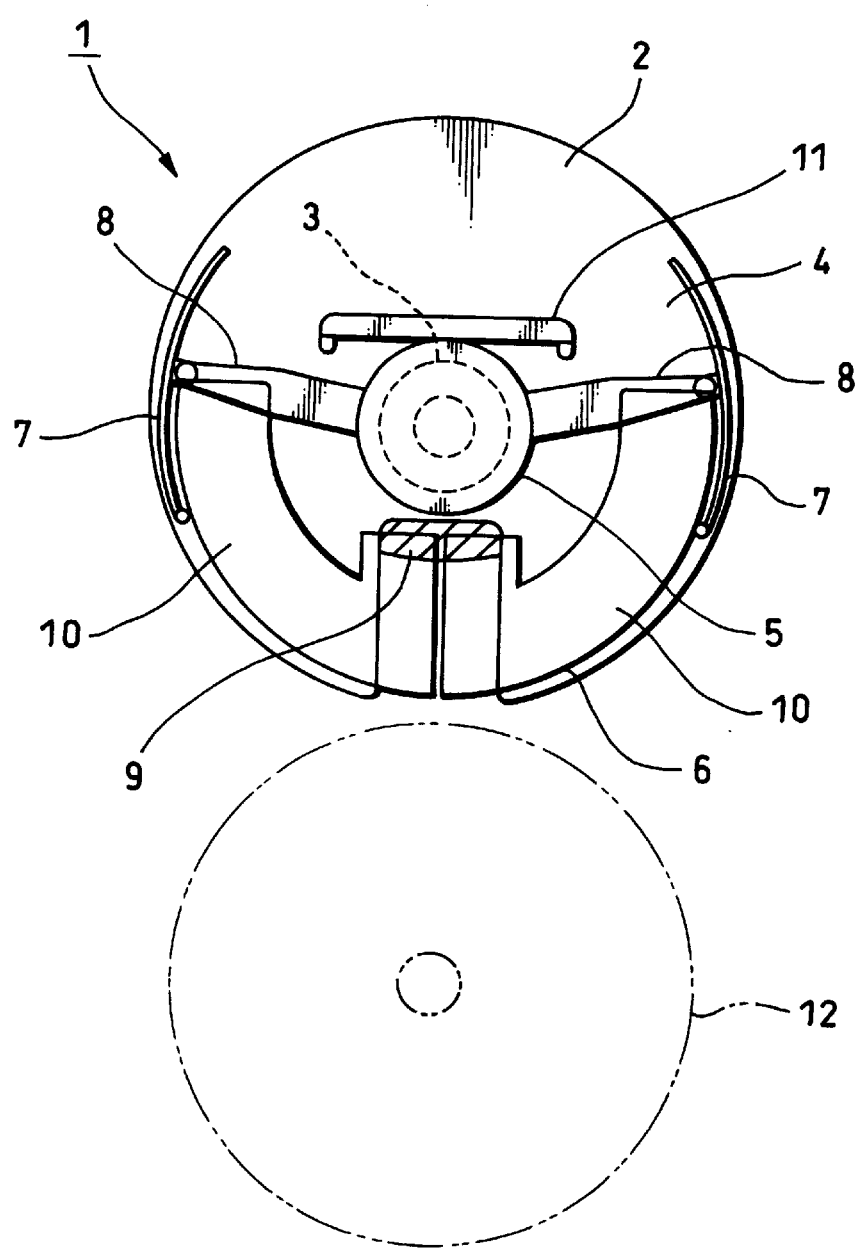
FIG. 1 shows a disc player concerning a first embodiment of the present invention together FIGS. 2 through 5 and is a schematic plan view showing a state immediately before a disc is inserted into a main body portion.

Hereafter, an embodiment of a recording and/or reproducing apparatus for a recording medium according to the present invention will be described with reference to the accompanying drawings. In an embodiment of the present invention described hereafter, a disc player, which uses a disc-shaped recording medium (hereinafter, referred simply to as a disc) such as a so-called compact disc or the like as a recording medium, is exemplified and described.

As shown in FIGS. 1 to FIG. 5, a disc player 1 concerning a first embodiment of the present invention includes a main body portion 2 having an external shape of a thick disc. Under the main body portion 2, there are provided a disc table 3 as a disc mounting portion and a chassis 4 having an optical pickup which is not illustrated. In an inner surface of an upper surface of the main body portion 2, a chucking mechanism 5 is disposed so as to be opposed to the disc table 3 the disc mounting portion. The disc table 3 is rotatably driven by a motor, not shown on the chassis 4.

Through a part (hereafter referred to as "front end portion") of the side face portion of the main body portion 2, an opening portion 6 as a disc insertion portion is formed.

The opening portion 6 as the disc insertion portion is opened and closed by shutters 7 and 7. When viewed from the top as shown in FIG. 1, each of the shutters 7 and 7 is formed to be of a circular arc shape, and the shutters 7 and 7 are disposed so as to slide in opposite directions along the outer periphery edge of the main body portion 2. Drive levers 8 and 8 are attached to the shutters 7 and 7. One end of each of the drive levers 8 and 8 is supported at a central portion of the top face of the main body portion 2 so as to be freely rotatable. The other end of each of the drive levers is coupled to each of the shutters 7 and 7 so as to be freely rotatable.

In the front end portion of the top face of the main body portion 2, an eject handle 9 is disposed so as to be movable in a backward and forward direction in parallel to the radius direction of a disc 12, described later, in FIG. 1. As the eject handle 9 is moved toward a rear end of its moving range or to a state shown in FIG. 1, the drive levers 8 and 8 are rotated in an interlocking manner therewith in such directions as to separate tip end edges thereof from each other and the shutters 7 and 7 are moved so as to separate to each other by the tip ends of drive levers 8 and 8. As a result, when the eject handle 9 has arrived at the rear end of its moving range shown in FIG. 1, the disc insertion portion or opening portion 6 is completely opened (see FIG. 1).

Chassis covers 10 and 10 are disposed so as to cover top faces located on both sides of the front end portion of the chassis 4. When viewed from above as shown in FIG. 1, each of the chassis covers 10 and 10 is formed so as to take the shape of a wide strip of substantially circular arc. The chassis covers 10 and 10 are made rotatable with respect to the chassis 4 so that their outer periphery portions will move in a upward and downward direction. As the shutters 7 and 7 are moved, the chassis covers 10, 10 are rotated in an interlocking manner therewith. When the shutters 7 and 7 are located in closing positions shown in FIG. 3, the chassis covers 10 and 10 are located at lower ends of their rotation ranges and the outer peripheral portions of the chassis covers 10 and 10 are located below a disc mounting face of the disc or turn table 3 as the disc mounting portion. When the shutters 7 and 7 are located in open positions shown in FIG. 1, the chassis covers 10, 10 are located at upper ends of their rotation ranges and the outer peripheral portions of the chassis covers 10, 10 are located above an upper end of the disc table 3 as the disc mounting portion.

Figure 3:
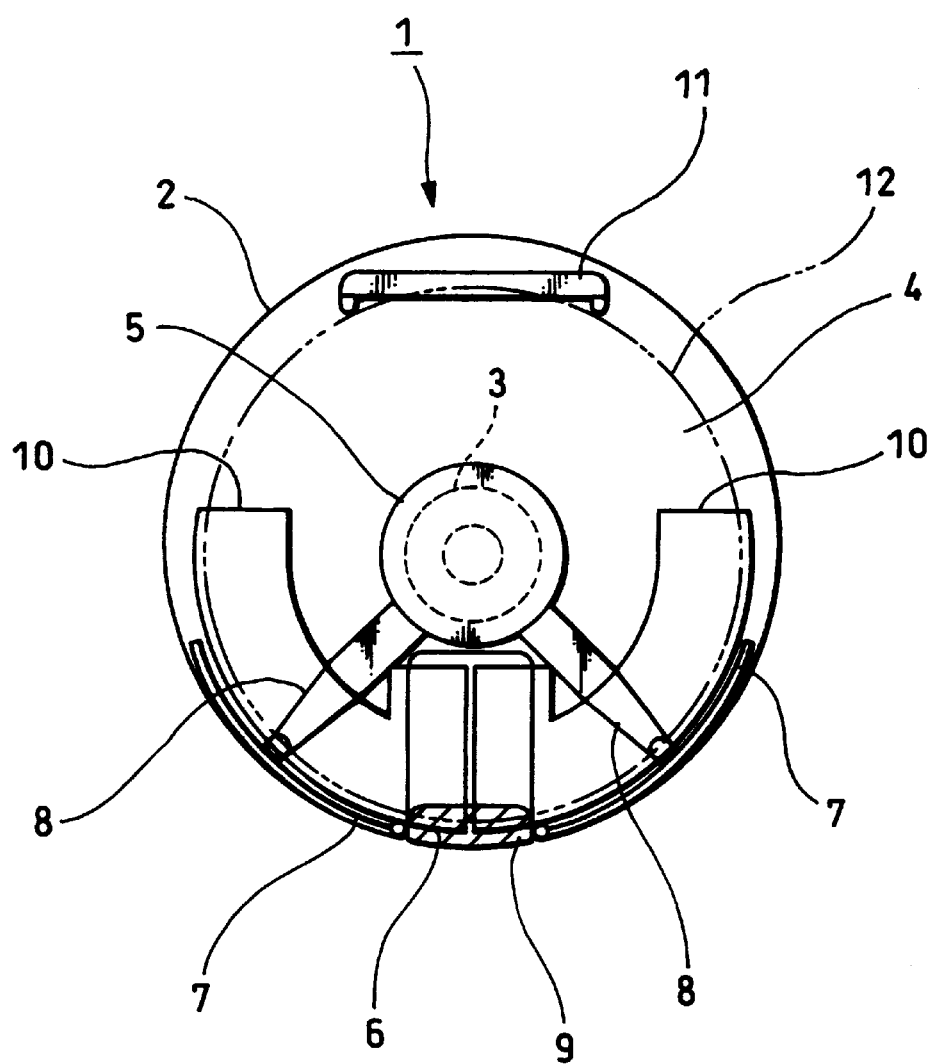
FIG. 3 is a schematic plan view showing such a state that the disc has been mounted on a disk mounting portion.

Inside the main body portion 2, an eject lever 11 is disposed so as to be freely movable in the forward and backward direction, namely between a position shown in FIG. 1 and a position shown in FIG. 3. The eject lever 11 is biased in a direction from the position shown in FIG. 3 to the position shown in FIG. 1. The eject lever 11 is made freely movable between an eject position shown in FIG. 1 and a stand-by position shown in FIG. 3. The eject lever 11 is locked at a stand-by position by a lever lock mechanism not shown. When the eject handle 9 has arrived at the rear end of its moving range shown in FIG. 5, the locking of the eject lever 11 is released and the eject lever 11 moves to the eject position shown in FIG. 5.

The eject handle 9 is biased in a direction directed from a position shown in FIG. 1 to a position shown in FIG. 3 and is locked at an open position where the eject handle arrives at the rear end of its moving range by a lock mechanism of handle 9 not shown. The locking of the handle 9 by the lock mechanism not shown is released by the arrival of the eject lever 11 at the stand-by position shown in FIG. 3. By the biasing force applied to the eject handle 9, the eject handle 9 is moved to the front end of its moving range, namely, to the position shown in FIG. 3. As a result, the drive levers 8 and 8 are rotated in such directions that the front ends thereof approach each other and the shutters 7 and 7 are moved to the closing positions where the disc insertion portion 6 is closed. When the eject handle 9 moves to the rear end of its moving range shown in FIG. 5, the chucking mechanism 5 is moved upward in an interlocking manner with the movement of the eject handle 9 to release the chucking state of the disc 12. If the eject handle 9 moves to the front end of its moving range namely to the position shown in FIG. 3, the chucking mechanism 5 moves downward to chuck the disc 12 with the disc table 3.

Insertion/discharge of the disc 12 such as a compact disc or the like into/from the main body portion 2 will now be described.

First of all, the eject handle 9 is moved backward or to the position shown in FIG. 1, and locked at the rear end in the moving range by the lock mechanism of handle 9 mentioned above. In an interlocking manner with the backward movement of the eject handle 9, the shutters 7 and 7 are moved to the open positions, and the opening portion 6 as the disc insertion portion is opened as shown in FIG. 1. As a result of movement of the shutters 7 and 7 to the open positions shown in FIG. 1, the chassis covers 10 and 10 rise up and their outer peripheral portions are located at positions higher than the position of the disc table 3 as the disc mounting portion.

Figure 2:
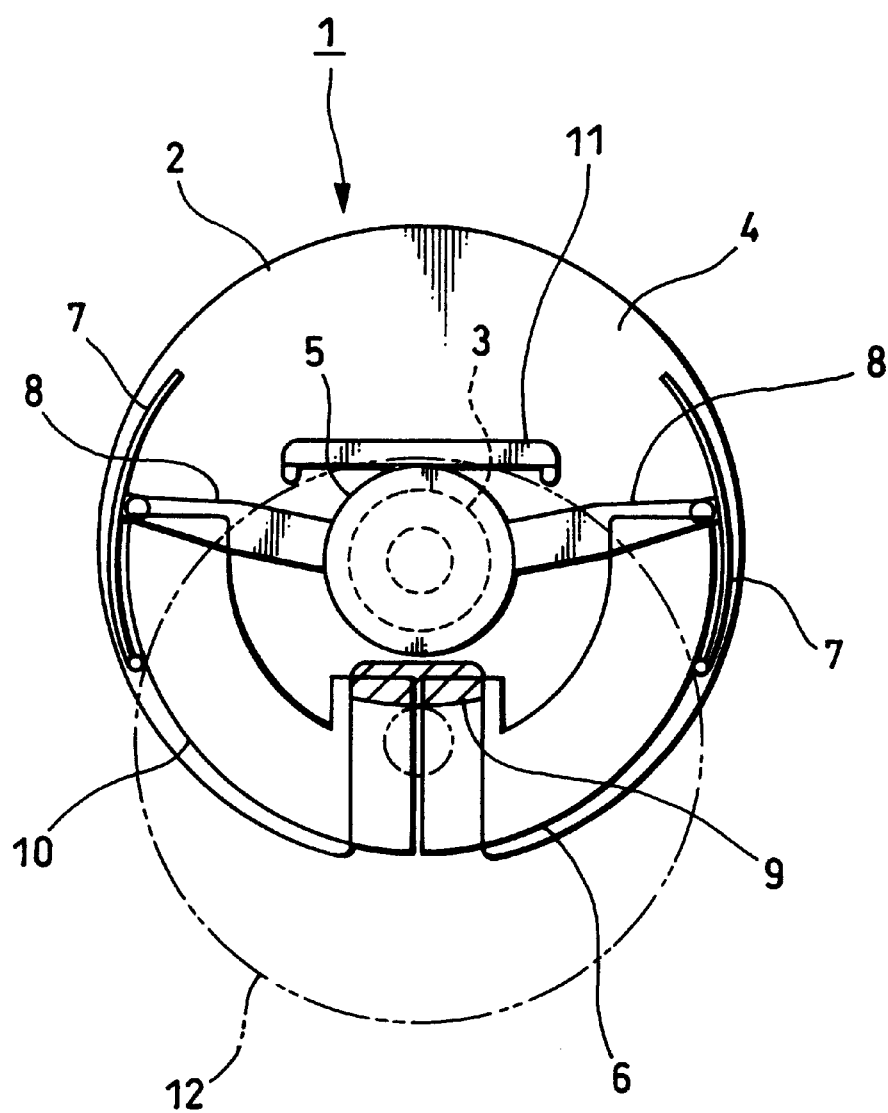
FIG. 2 is a schematic plan view showing such a state that the disc is inserted into the main body portion and an insertion tip end of the disc comes into contact with an eject lever.

As the disc 12 is inserted from the opening portion 6 as the disc insertion portion into the main body portion 2, the tip end of the inserted side of the disc 12 touches the eject lever 11 as shown in FIG. 2. Since at this time the outer peripheral edge portions of the chassis covers 10 and 10 are located at positions higher than the position of the disc table 3 as the disc mounting portion, the disc 12 is supported by the outer peripheral portions of the chassis covers 10 and 10 and does not interfere with the disc table 3 as the disc mounting portion.

As the disc 12 is further inserted into the main body portion 2 from the state shown in FIG. 2, the eject lever 11 is pressed by the disc 12 and moved backward, namely to the position shown in FIG. 3. At the same time that the disc 12 has been inserted completely in the main body portion 2, as shown in FIG. 3, the eject lever 11 arrives at the stand-by position, namely at the position shown in FIG. 3 by the lever lock mechanism, and the eject lever is locked thereat, namely at the position shown in FIG. 3.

At the same time that the eject lever 11 arrives at the stand-by position as shown in FIG. 3, locking of the eject handle 9 by its block mechanism mentioned above is released. The eject handle 9 is biasing forward by the moving forward, or to the positions shown in FIG. 3 by the biasing force applied to the eject handle 9. Then, in an interlocking manner with the movement of handle 9, the shutters 7 and 7 are moved toward the closing positions of the opening portion 6 and then the chucking mechanism 5 falls down.

At the same time that eject handle 9 arrives at the front end of the moving range or the position shown in FIG. 3, the shutters 7 and 7 arrive at the closing positions of the opening portion 6 and the opening portion 6 as the disc insertion portion is closed thereby. As the shutters 7 and 7 move toward the closing positions, the chassis covers 10 and 10 fall. The outer edge portions of the chassis covers 10 and 10 move to positions lower than the disc mounting face of the disc table 3 as the disc mounting portion. As a result, the disc 12 also falls, and the central portion of the disc 12 is placed on the disc table 3 as the disc mounting portion. The chucking mechanism 5 is absorbed by a magnet which is provided on the disc table 3 as the disc mounting portion and which is not illustrated. Thus, the disc 12 inserted from the opening portion 6 is held between the chucking mechanism 5 and the disc table 3 as the disc mounting portion. As a result, chucking of the disc 12 is conducted.

As described above, the disc table 3 as the disc mounting portion is rotated by the above-said motor not shown in such a state that the disc 12 is chucked. Since disc table 3 is rotated, the disc 12 is rotated. In addition, the data recorded on the disc 12 is read out while an optical pickup which is located on the chassis 4 but is not illustrated is moving in the radial direction of the disc 12. By subjecting the read data to signal processing, the data recorded on the disc 12 is reproduced.

Figure 4:
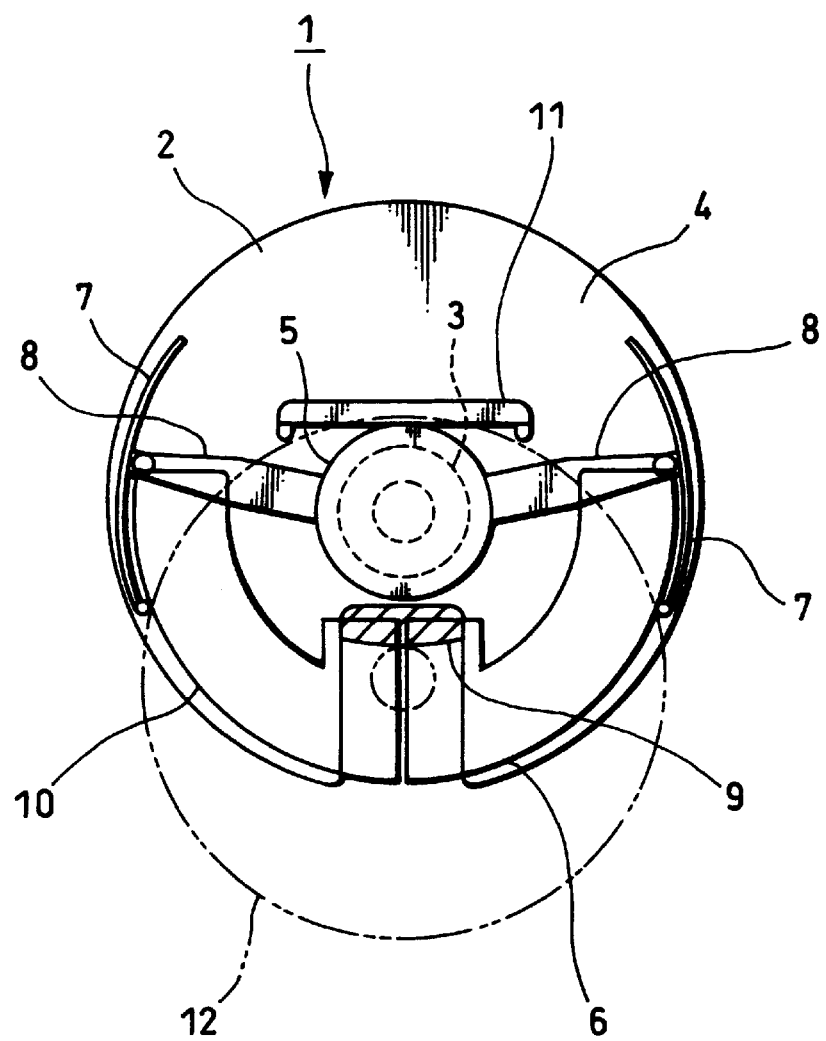
FIG. 4 is a schematic plan view showing such a state that a part of the disc has been ejected from the disk insertion portion to the outside of the main body portion.

When reproduction of the disc 12 is finished and the disc 12 is taken out from the player 1, the eject handle 9 is moved backward or in the direction from the position shown in FIG. 3 to the position shown in FIG. 4. In an interlocking manner with the movement of the eject handle 9, the shutters 7 and 7 move to the open positions of the opening portion 6, and the disc insertion portion 6 is thus opened. The chucking mechanism 5 moves upward above the player 1. Such a state that the disc 12 is chucked by the chucking mechanism 5 and the disc table 3 as the disc mounting portion is thus released. In addition, the chassis covers 10 and 10 rise above the player 1, and the disc 12 is moved upward from the disc table 3 as the disc mounting portion.

When the eject handle 9 arrives at the rear end of the moving range as shown in FIG. 4, the eject handle 9 is locked at that position by the lock mechanism of handle 9 not shown as described above. At the same time that the eject handle 9 is locked, locking of the eject lever 11 at the stand-by position by the lock mechanism of the lever not shown is released. The eject lever 11 is moved forward by the biasing force applied to the lever 11 to the position shown in FIG. 5. By the eject lever 11 being moved to the position shown in FIG. 5, the disc 12 is pressed forward or projected from the opening portion 6 of the player 1. As a result, a part of the disc 12 is pushed out from the opening portion 6 as the disc insertion portion to the outside of the main body portion 2 as shown in FIG. 4.

Figure 5:
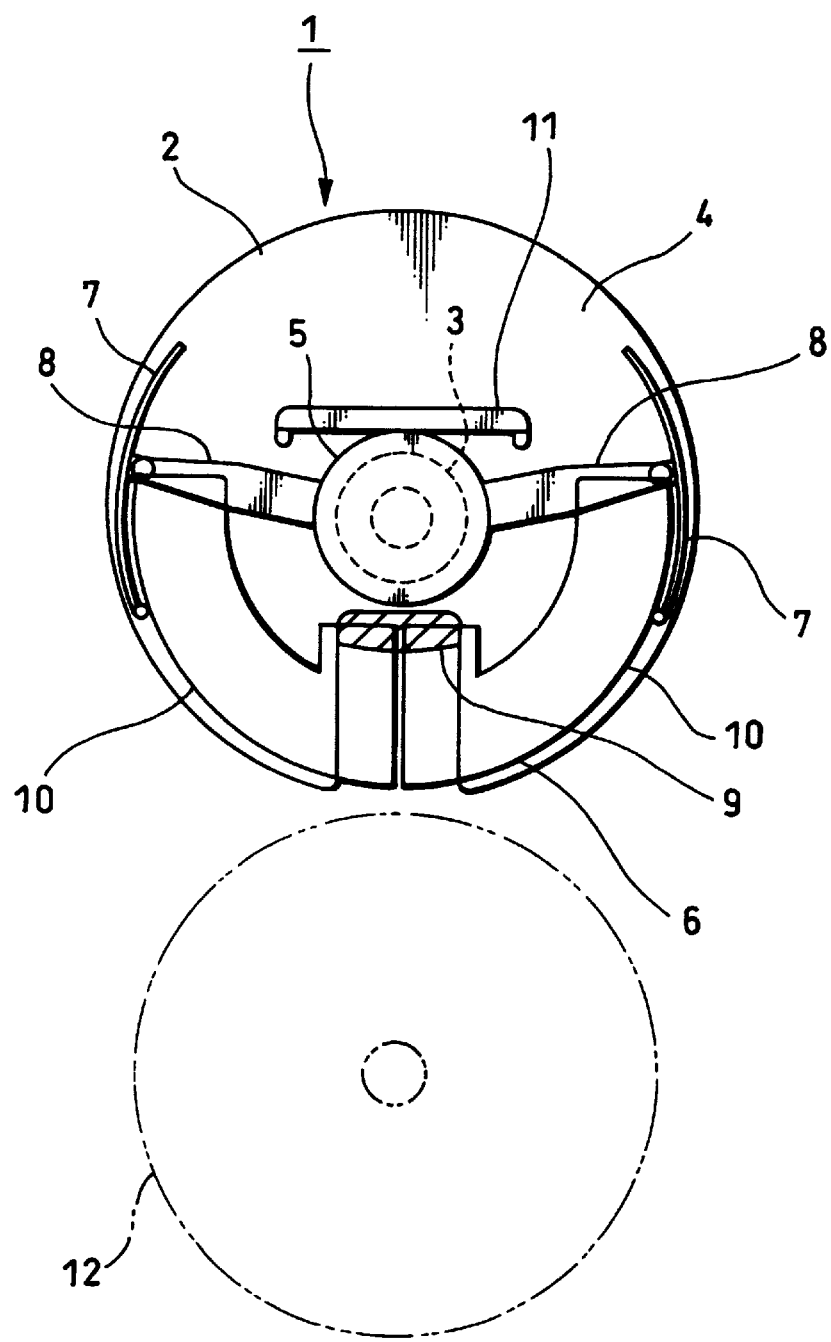
FIG. 5 is a schematic plan view showing such a state that the disc has been taken out from the main body portion.

If the part of the disc 12 pushed out to the outside of the opening portion 6 of the main body portion 2 is pulled out by the user's hand or finger, the DISC 12 can be taken out to the outside of the main body portion 2 as shown in FIG. 5.

With reference to FIGS. 6 through 10, a disc player concerning a second embodiment of the present invention will be described.

A disc player 13 includes a main body portion 14 having an external shape of a thick disc shown in FIG. 5. Under the main body portion 14, there are disposed a disc mounting portion 15 and a chassis 16 having an optical pickup which is not illustrated. On an inner surface of an upper surface of the main body portion 14, a chucking mechanism 17 is disposed so as to be opposed to the disc mounting portion 15. The disc table 15 is rotated by a motor mounted on the chassis 16.

In a front end portion of the main body portion 14, an opening portion 18 as the disc insertion portion is formed.

Figure 6:
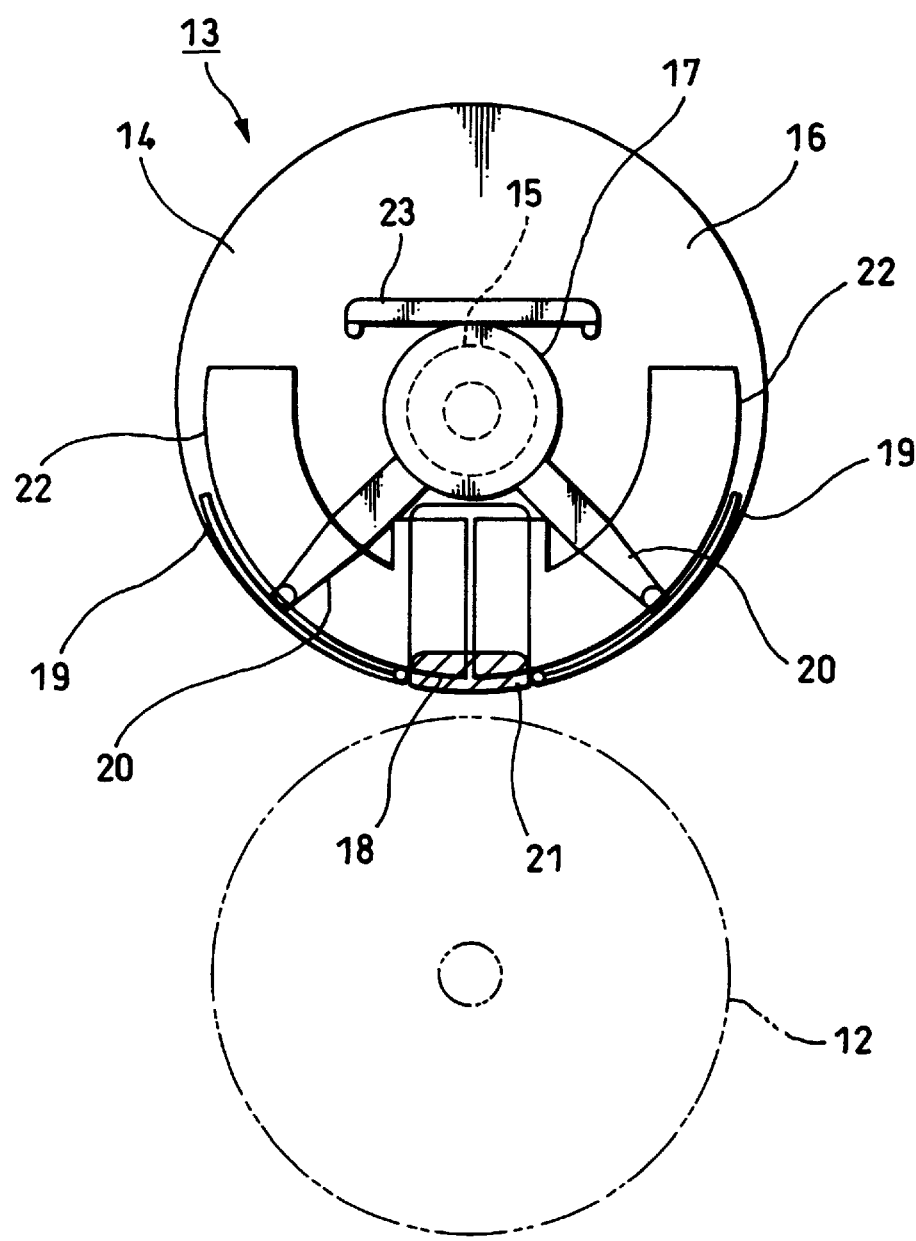
FIG. 6 shows a disc player concerning a second embodiment the present invention together with FIGS. 7 through 10, and is a schematic plan view showing a state immediately before an insertion tip end of a disc comes in contact with ends of shutters.

The opening portion 18 as the disc insertion portion is opened and closed by shutters 19 and 19. When viewed from above as shown in FIG. 6, each of the shutters 19 and 19 takes the shape of a circular arc, and the shutters 19 and 19 are disposed so as to be slidable in opposite directions along the outer periphery of the main body portion 14. Drive levers 20 and 20 are attached to the shutters 19 and 19. One end of each of the drive levers 20 and 20 is supported at a central portion of the top face of the main body portion 14 so as to be freely rotatable. The other end of each of the drive levers is coupled to each of the shutters 19 and 19 so as to be freely rotatable.

Figure 8:
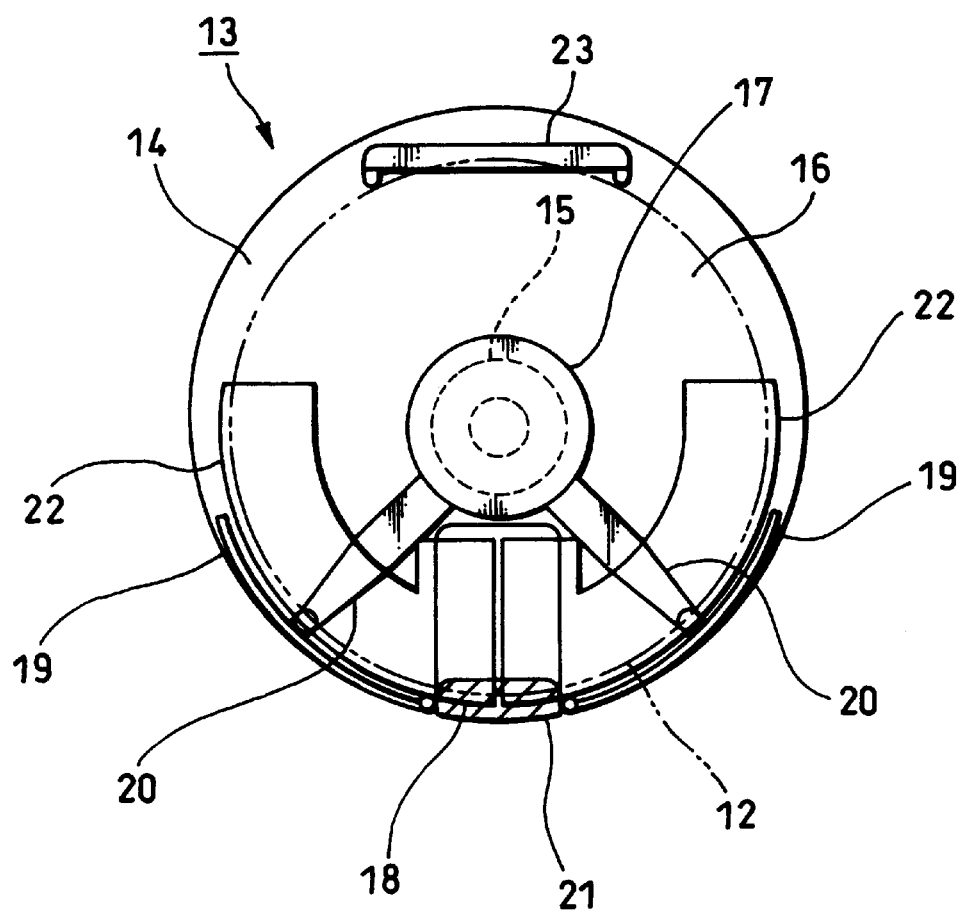
FIG. 8 is a schematic plan view showing such a state that the disc has been mounted on a disk mounting portion.
Figure 9:
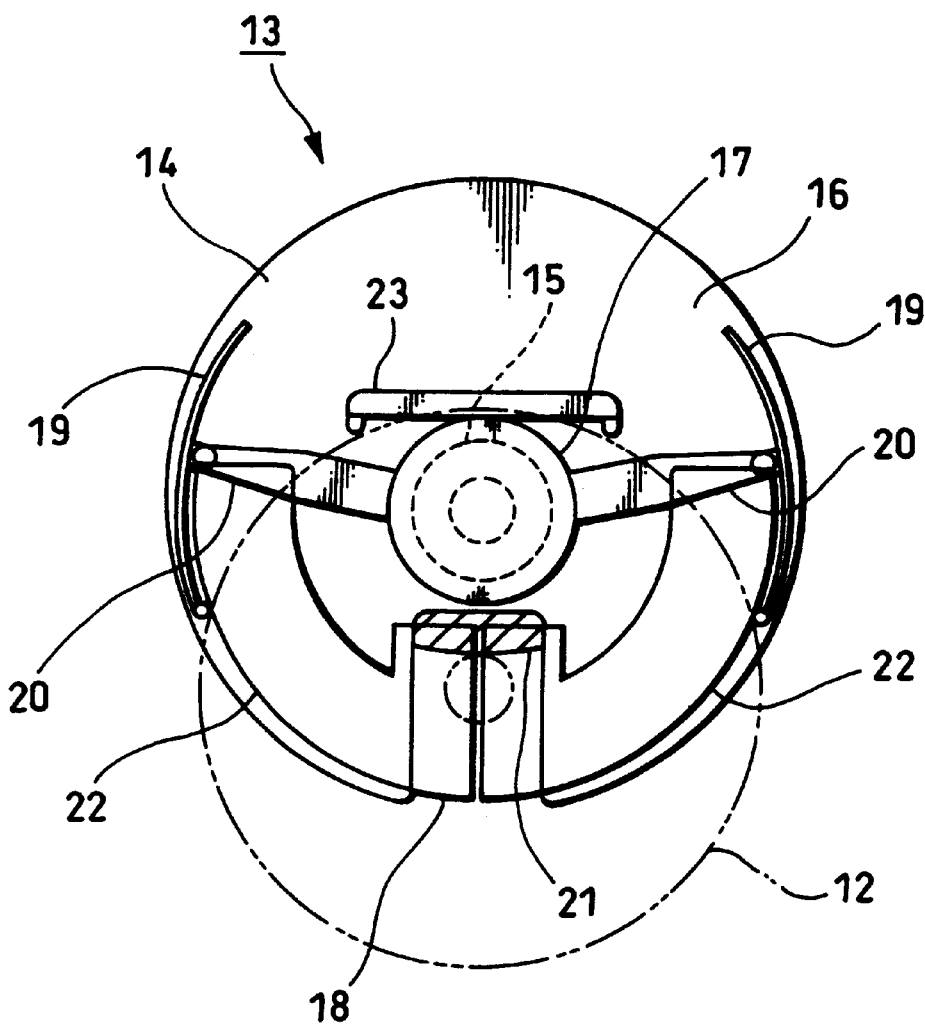
FIG. 9 is a schematic plan view showing such a state that a part of the disc has been ejected from the disc insertion portion to the outside of the main body portion.

In the front end portion of the upper face of the main body portion 14, an eject handle 21 is disposed so as to be movable in the backward and forward direction or in the direction parallel to the radius direction of disc 12 between the positions shown in FIGS. 6 and 8. The eject handle 21 and the drive levers 20 and 20 are coupled so that their movements may be interlocked with one another. As the eject handle 21 is moved toward a rear end of its moving range or the position shown in FIG. 9, the drive levers 20 and 20 are rotated in an interlocking manner therewith in such directions as to separate tip edges thereof from each other. When the tip ends of the drive levers 20 and 20 are rotated in the direction to be separated with each other, the shutters 19 and 19 are moved to be separated with each other by the tip edges. When the eject handle 21 has arrived at the rear end of its moving range as shown in FIG. 9, the disc insertion portion 18 is completely opened. At this time, forward biasing force is applied to the eject handle 21.

Chassis covers 22 and 22 are disposed so as to cover top faces located on both sides of the front end portion of the chassis 16 as shown in FIG. 6. When viewed from above, each of the chassis covers 22 and 22 is formed so as to take the shape of a wide strip of substantially circular arc. The chassis covers 22 and 22 are made rotatable with respect to the chassis 16 so that their outer peripheral portions will move in the upward and downward direction of the player 13. As the shutters 19 and 19 are moved, the chassis covers 22 and 22 are rotated in an interlocking manner therewith. When the shutters 19 and 19 are located in closing positions shown in FIG. 6, the chassis covers 22, 22 are located at lower ends of their rotation ranges and the outer peripheral portions of the chassis covers 22, 22 are located below a disc mounting face of the disc mounting portion 15. When the shutters 19 and 19 are located at open positions shown in FIG. 9, the chassis covers 22, 22 are located at top ends of their rotation ranges and the outer peripheral portions of the chassis covers 22, 22 are located above a top end of the disc mounting portion 15.

Inside the main body portion 14, an eject lever 23 is disposed so as to be freely movable in the forward and backward direction, namely between the positions shown in FIGS. 6 and 8. The eject lever 23 is given with biasing force to the front or to the position shown in FIG. 6. The eject lever 23 is made freely movable between an eject position shown in FIG. 6 and a stand-by position shown in FIG. 8. The eject lever 23 is locked at the stand-by position shown in FIG. 8 by a lock mechanism of lever 23 not shown. When the eject handle 21 has arrived at the rear end of its moving range as shown in FIG. 7, the locking by the above lock mechanism not shown is released and the eject lever 23 moves up to the eject position shown in FIG. 6, FIG. 9 or FIG. 10.

Figure 7:
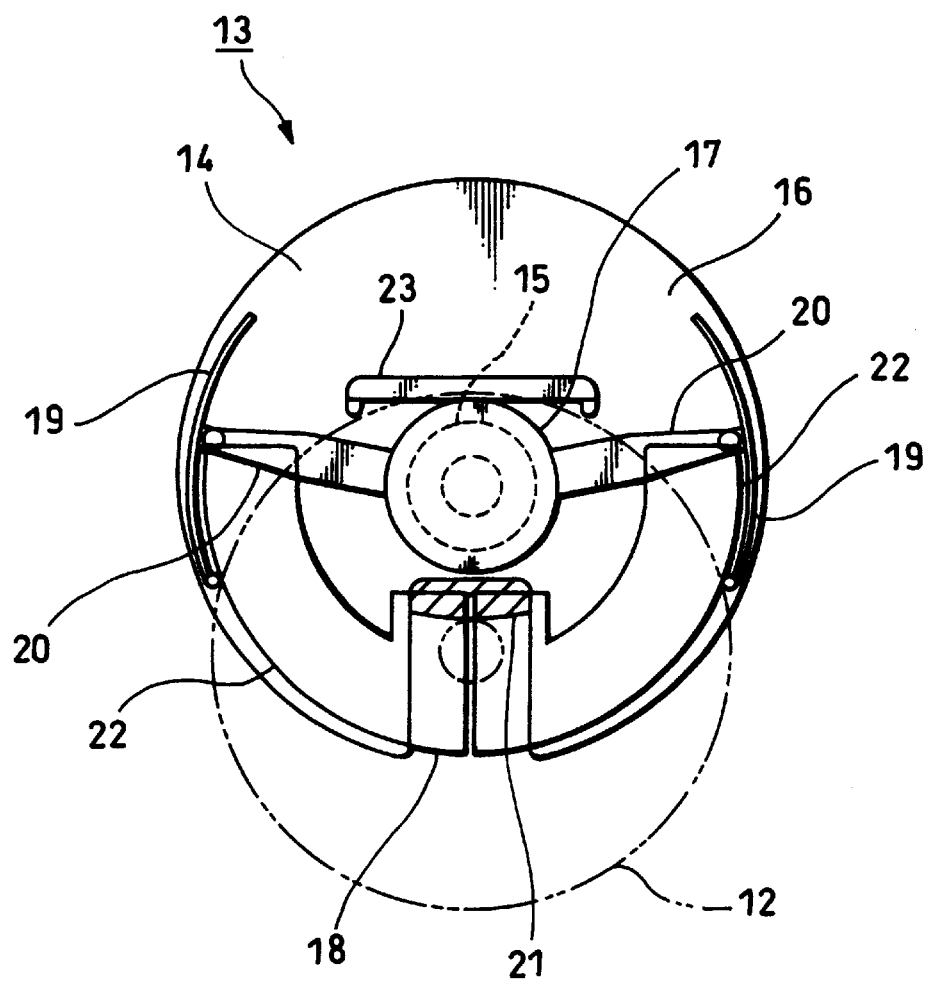
FIG. 7 is a schematic plan view showing such a state that the disc is inserted into a main body portion and the insertion tip end thereof comes into contact with an eject lever.

When the eject handle 21 moves to the rear end of the moving range or the position shown in FIG. 7, the chucking mechanism 17 is moved upward in an interlocking manner with the movement of handle 21 to release the chucking state of the disc 12. While when the eject handle 21 moves to a front end of its moving range or the position shown in FIG. 8, the chucking mechanism 17 moves downward to carry out the chucking operation of disc 12.

Insertion/disc are of the disc 12 into/from the disc player 13 of the second embodiment will now be described.

First of all, an end of an insertion side of the disc 12 is made in contact with one ends of the shutters 19 and 19. If the disc 12 is pushed in such a direction that the disc 12 is inserted into the main body portion 14 under the state that the disc 12 is in contact with the shutters 19, 19, then the one ends of the shutters 19 and 19 are pressed by the outer edge of the inserted disc 12 and moved toward the open positions to open the opening portion 18. In this way, the disc 12 is inserted from the disc insertion portion 18 into the main body portion 14, while the disc itself is expanding the shutters 19 and 19. Then, the end of the insertion side of disc 12 touches the eject lever 23 shown in FIG. 7. During that time, the chassis covers 22 and 22 rotate so that their outer peripheral portions may rise. Without interfering with the disc mounting portion 15, therefore, the disc 12 is inserted into the main body portion 14.

From the state shown in FIG. 7, when the disc 12 is further inserted into the main body portion 14, and the maximum diameter portion of the disc 12 passes from end portions of the shutters 19 and 19 to the interior, namely the maximum diameter portion of disc 12 is moved to the interior of the main body portion 14 exceeding the rotation center of disc table 15, then the shutters 19 and 19 are moved toward the closing positions of the opening portion 18 by biasing force applied to the eject handle 21 while the shutters 19, 19 are sliding along the outer periphery edge of the disc 12. If the disc 12 is completely inserted into the main body portion 14 as shown in FIG. 8, the eject lever 23 arrives at the stand-by position, and is locked thereat by the above lock mechanism of the lever. The shutters 19 and 19 arrive at closing positions of the opening portion 18, and the eject handle 21 also returns to the front end of its moving range.

As the eject handle 21 moves forward as shown in FIG. 8, the chucking mechanism 17 falls. As the shutters 19 and 19 move toward the closing positions, the chassis covers 22 and 22 fall. The outer peripheral portions of the chassis covers 22, 22 move to positions lower than the disc mounting face of the disc mounting portion 15. As a result, the disc 12 also falls, and its central portion is placed on the disc mounting portion 15. The chucking mechanism 17 is absorbed by a magnet which is provided on the disc mounting portion 15 and which is not illustrated. Thus, the disc 12 is held between the chucking mechanism 17 and the disc mounting portion 15. As a result, chucking of the disc 12 inserted into the player 13 is conducted.

As described above, under the state that the disc 12 is chucked by the chucking mechanism 17 and the disc table 15, the disc mounting portion 15 is rotated by the above motor not shown. When the disc table 15 is rotated, the disc 12 is rotated. The data recorded on the disc 12 is read while an optical pickup which is not illustrated is moving in a radial direction of the disc 12. The data read from the disc 12 is subjected to signal processing, and the data recorded on the disc 12 is reproduced.

When reproduction of the disc 12 is finished and the disc 12 is taken out from the player 13, the eject handle 21 is moved backward as shown in FIG. 9. In an interlocking manner with the movement of handle 21, the shutters 19 and 19 move to the open positions of the opening portion 18 and open the opening portion 18. The chucking mechanism 17 moves upward within the player 13. Such a state that the disc 12 is chucked by the chucking mechanism 17 and the disc mounting portion 15 is thus released. In addition, the chassis covers 22 and 22 rise, and the disc 12 is moved from a position where the disc 12 is placed to a position higher than the disc mounting portion 15.

If the eject handle 21 arrives at the rear end of the moving range, locking of the eject lever 23 at the stand-by position by the lever lock mechanism mentioned above is released. The eject lever 23 is moved to the position shown in FIG. 10 by the biasing force applied to the eject lever 23. By the eject lever 23 being moved to the position shown in FIG. 10, the disc 12 is pressed forward. As a result, as shown in FIG. 9, a part of the disc 12 is pushed out from the opening portion 18 as the the disc insertion portion to the outside of the main body portion 14.

Figure 10:
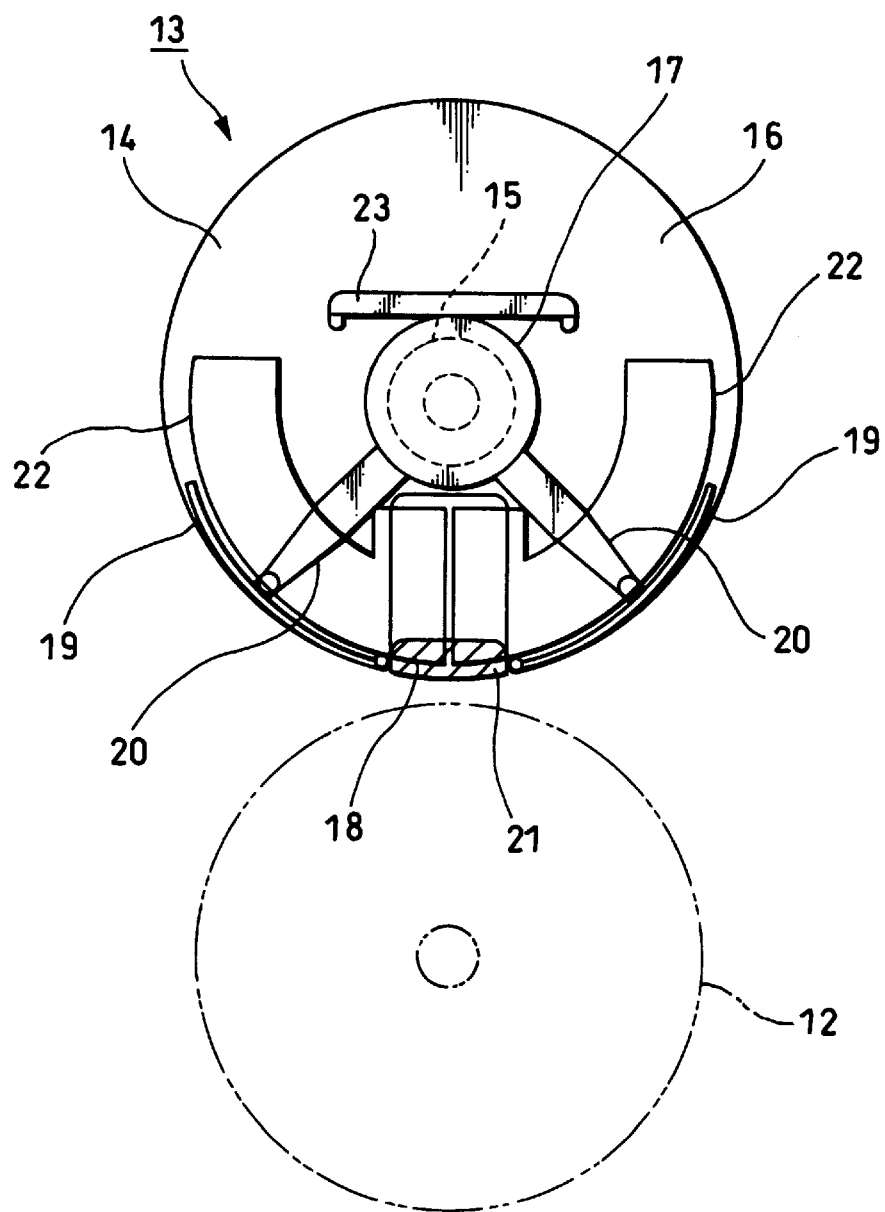
FIG. 10 is a schematic plan view showing such a state that the disc has been taken out from the main body portion.

If a part of the disc 12 pushed out to the outside of the main body portion 14 under the state shown in FIG. 9 is pulled out by the user's finger or hand, the disc 12 can be taken out to the outside of the main body portion 14 as shown in FIG. 10.

With reference to FIGS. 11 through 15, a disc player concerning a third embodiment of the present invention will be described in detail.

A disc player 24 according to the third embodiment includes a main body portion 25 having an external shape of a thick disc as shown in FIGS. 11 to 15. Under the main body portion 25, there are disposed a disc mounting portion 26 and a chassis 27 provided with an optical pickup which is not illustrated. On an inner surface of the upper surface of the main body portion 25, a chucking mechanism 28 is disposed so as to be opposed to the disc table 26 as to the disc mounting portion. The disc table 26 is rotated by a motor mounted on the chassis 27 and not shown.

In a front end portion of the main body portion 25, an opening portion 29 as a disc insertion portion is formed.

Figure 11:
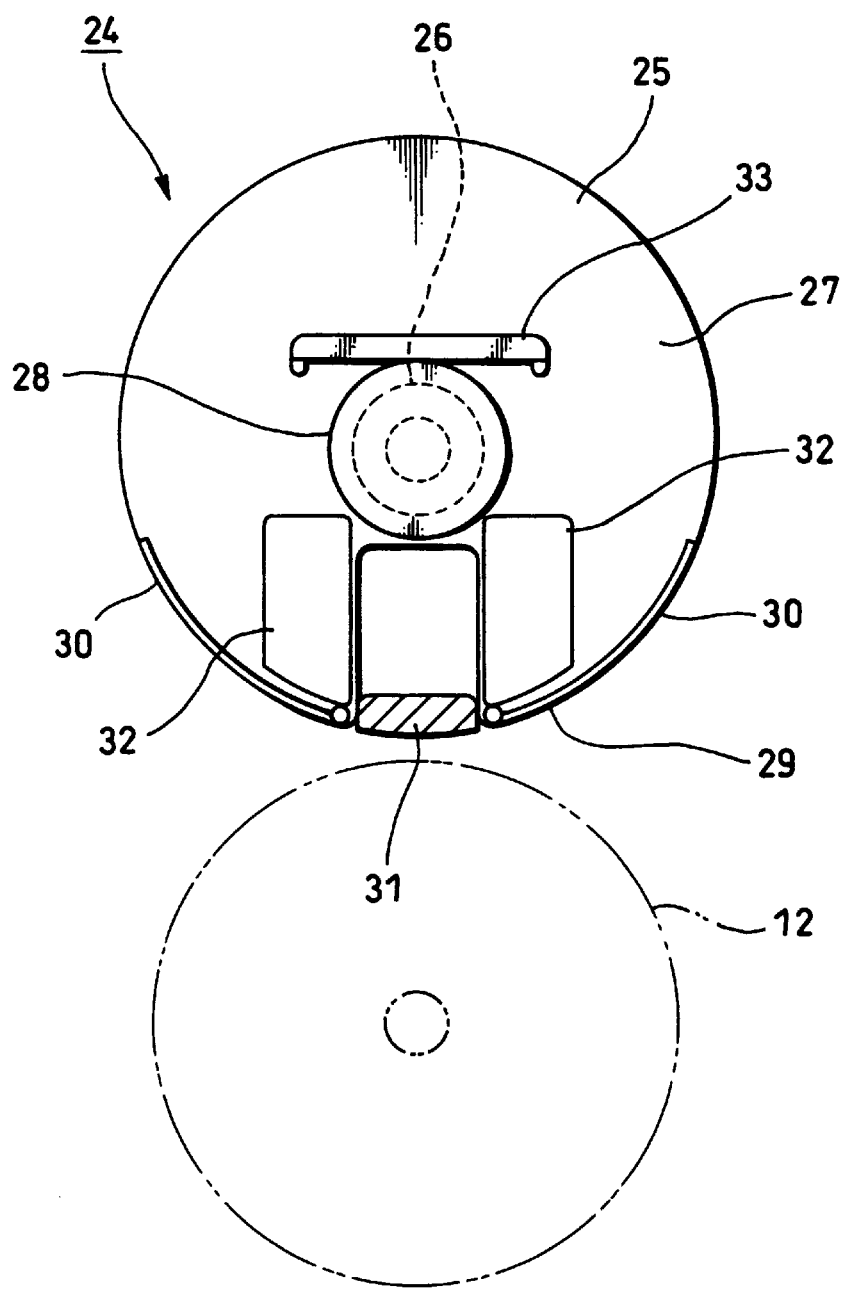
FIG. 11 shows a disc-player concerning a third embodiment of the present invention together FIGS. 12 through 15 and is a schematic plan view showing a state immediately before an insertion tip end of a disc comes in contact with rotation ends of shutters.

The disc insertion portion 29 is opened and closed by shutters 30 and 30. When viewed from the top, each of the shutters 30 and 30 takes the shape of a circular arc as shown in FIG. 11. Rear ends of the shutters 30, 30 are supported by both side portions of the main body portion 25 so as to be freely rotatable.

Figure 12:
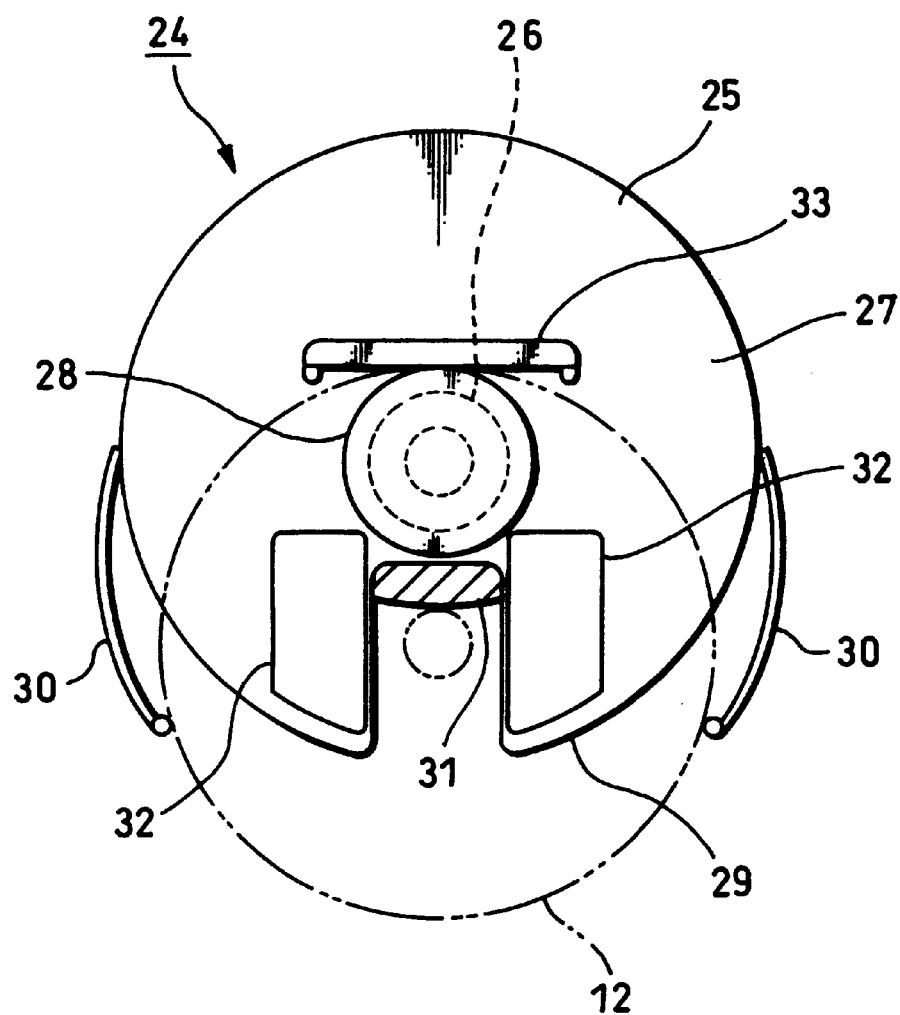
FIG. 12 is a schematic plan view showing such a state that the disc is inserted into a main body portion and the insertion tip end of the disc into contact with an eject lever.

In the front end portion of the top face of the main body portion 25, an eject handle 31 is disposed so as to be movable in the backward and forward direction, namely between the positions shown in FIGS. 11 and 12. The eject handle 31 and the shutters 30 and 30 are coupled so that their movements may be interlocked with each other.

Chassis covers 32 and 32 are disposed so as to cover upper faces located on both sides of the front end portion of the chassis 27. When viewed from above, each of the chassis covers 32 and 32 is formed so as to take the shape of a wide strip of substantially circular arc as shown in FIG. 11. The chassis covers 32, 32 are provided so as to be rotatable with respect to the chassis 27 so that outer peripheral edge portions of chassis covers 32, 32 will move in the upward and downward direction within the main body portion 25 of the player 24. As the shutters 30 and 30 are moved, the chassis covers 32, 32 are rotated in an interlocking manner therewith. When the shutters 30 and 30 are located at closing positions shown in FIG. 13, the chassis covers 32, 32 are located at lower ends of their rotation ranges and the outer peripheral edge portions of the chassis covers 32, 32 are located below a disc mounting face of the disc mounting portion 26. When the shutters 30 and 30 are located at open positions shown in FIG. 12, the chassis covers 32, 32 are located at upper ends of their rotation ranges and the outer peripheral edge portions of the chassis covers 32, 32 are located above the disc mounting face of the disc mounting portion 26.

Figure 13:
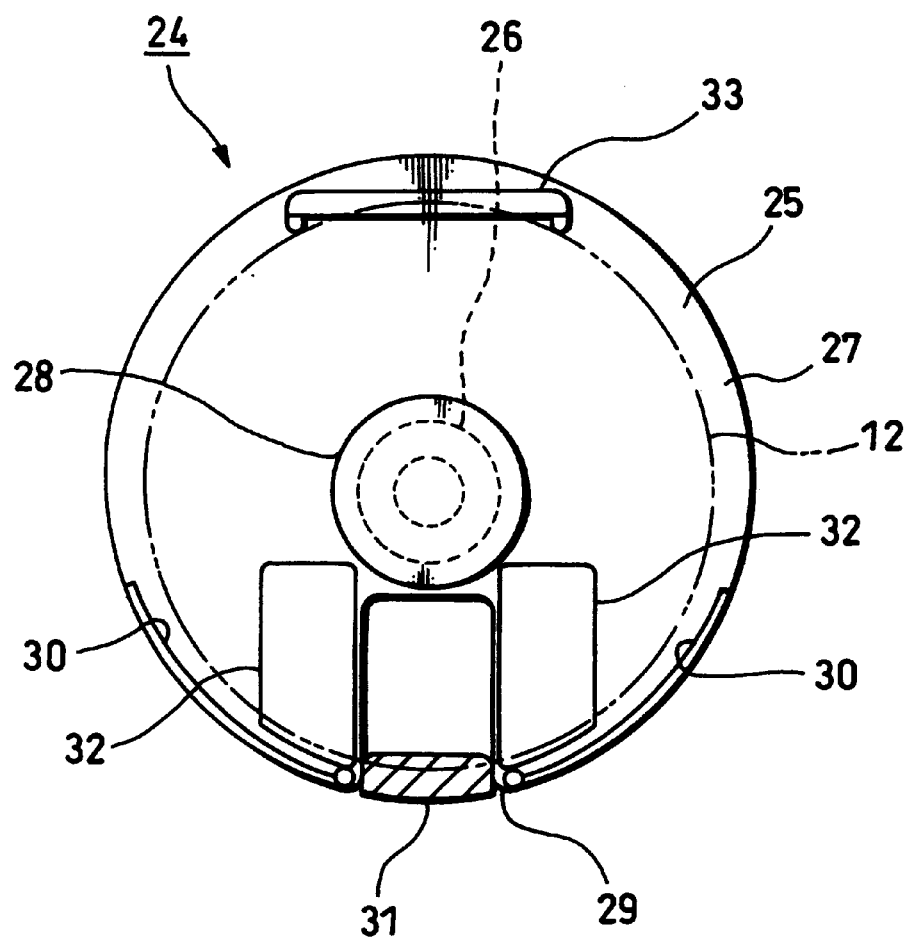
FIG. 13 is a schematic plan view showing such a state that the disc has been mounted on a disc mounting portion.

Inside the main body portion 25, an eject lever 33 is disposed so as to be freely movable in the forward and backward direction, namely between the positions shown in FIGS. 11 and 13. The eject lever 33 is given with a biasing moving force to the front or direction toward FIG. 11. The eject lever 33 is made freely movable between an eject position shown in FIG. 11 and a stand-by position shown in FIG. 13. The eject lever 11 is locked at the stand-by position shown in FIG. 13 by a lever lock mechanism not shown. When the eject handle 31 has arrived at the rear end of its moving range namely the position shown in FIG. 14, the locking of the eject lever 33 by the lever lock mechanism mentioned above and not shown is released and the eject lever 33 moves up to the eject position shown in FIG. 11. By the way, the eject handle 31 is given with biasing force to the front or the direction shown in FIG. 11. If the eject handle 31 moves to the rear end of the moving range as shown in FIG. 12, the chucking mechanism 28 is moved upward to release the chucking state of disc 12 in an interlocking manner with the movement of handle 31. While, if the eject handle 31 moves to a front end of its moving range as shown in FIG. 13, the chucking mechanism 28 moves downward to perform the chucking of disc 12.

Insertion/ejection of the disc 12 into/from the disc player 24 according to the third embodiment will now be described.

First of all, an end portion on an insertion side of the disc 12 is made in contact with rotation end portions of the shutters 30 and 30. Under the state that the disc 12 is made in contact with the shutters 30, 30, when the disc 12 is moved or pushed in such a direction that the disc 12 is inserted into the main body portion 25, then the rotation end portions of the shutters 30 and 30 are pressed by the outer edge of the inserted disc 12 inserted through the opening portion 29 and rotated toward the open positions. As shown in FIG. 12, the disc 12 is inserted from the disc insertion portion 29 into the main body portion 25, while the disc 12 itself is rotating the shutters 30 and 30 toward the open positions. Then, the tip end of the insertion side of disc 12 touches the eject lever 33. During that time, since the chassis covers 32 and 32 move such that their outer edge portions may rise, without interfering with the disc mounting portion 26, therefore, the disc 12 is inserted into the main body portion 25 from the opening portion 29.

From the state shown in FIG. 12, when the disc 12 is further inserted into the main body portion 25, and the maximum diameter portion of the disc 12 passes from end portions of the shutters 30 and 30 to the interior, namely the maximum diameter portion of disc 12 passes through the fulcrum of rotation of shutters 30, 30 and progresses into the player 24, then the shutters 30 and 30 are rotated toward the closing positions to close the opening portion 29 by the biasing force applied to the eject handle 31 while the shutters 30, 30 are sliding along the outer edge of the disc 12. If the disc 12 is completely inserted into the main body portion 25 as shown in FIG. 13, the eject lever 33 arrives at the stand-by position, and is locked thereat by the lever lock mechanism not shown as mentioned above. The shutters 30 and 30 arrive at closing positions to close the opening portion 29, and the eject handle 31 also returns to the front end of its moving range as shown in FIG. 13.

As the eject handle 31 moves forward, the chucking mechanism 28 falls. As the shutters 30 and 30 rotate toward the closing positions to close the opening portion 29, the chassis covers 32 and 32 fall. The outer edge peripheral portions of the chassis covers 32, 32 move to positions lower than the disc mounting face of the disc mounting portion 26. As a result, the disc 12 also falls in association with the down movement of chassis covers 32, 32 and the central portion of disc 12 is placed on the disc mounting portion 26. The chucking mechanism 28 is absorbed by a magnet which is provided on the disc mounting portion 26 and which is not illustrated. Thus, the disc 12 is held between the chucking mechanism 28 and the disc mounting portion 26. As a result, chucking of the disc 12 is conducted.

As described above, the disc mounting portion 26 is rotated by the motor not shown under such a state that the disc 12 is chucked by the chucking mechanism 28 and the disc table 26. As a result, the disc 12 is rotated. When the disc 12 is rotated, the data recorded on the disc 12 is read out while an optical pickup which is not illustrated is moving in the radial direction of the disc 12. The read data is subjected to signal processing so that the data recorded on the disc 12 is reproduced.

Figure 14:
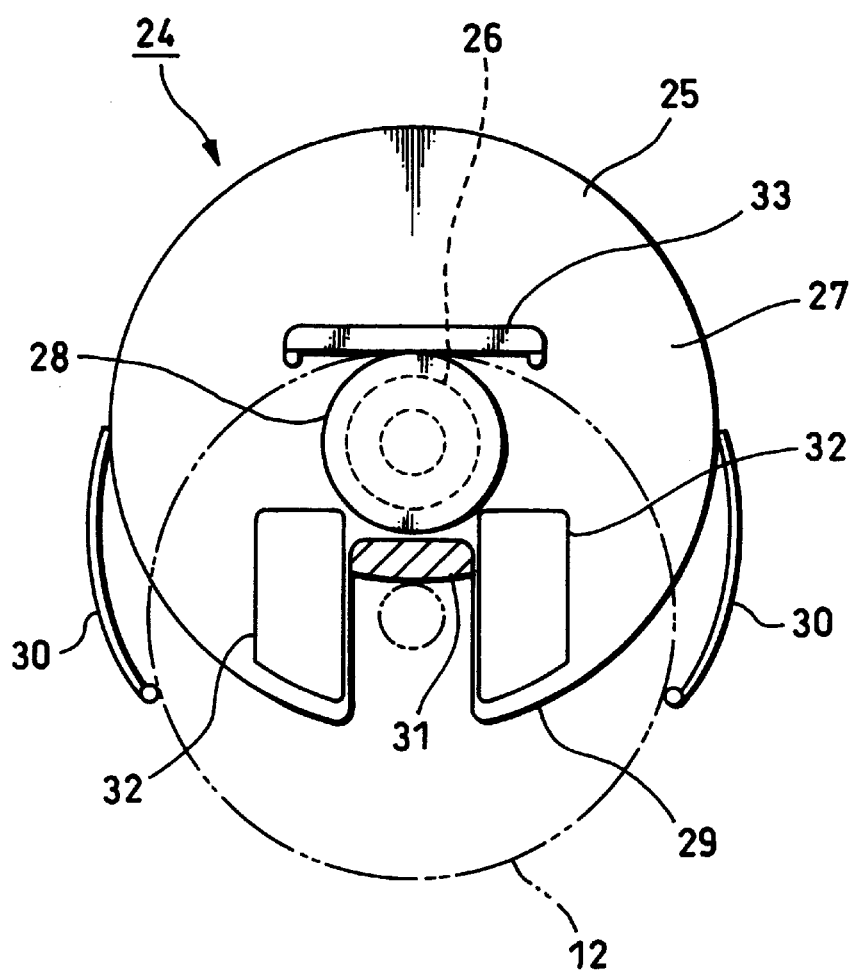
FIG. 14 is a schematic plan view showing such a state that a part of the disc has been ejected from the disc insertion portion to the outside of the main body portion.

When reproduction of the disc 12 is finished and the disc 12 is taken out from the player 24, the eject handle 31 is moved backward as shown in FIG. 14. In an interlocking manner with the movement of handle 31, the shutters 30 and 30 rotate to the open positions to open the disc insertion portion 29. The chucking mechanism 28 moves upward and such a state that the disc 12 is chucked by the chucking mechanism and the disc mounting portion 26 is thus released. In addition, the chassis covers 32 and 32 rise, and the disc 12 is moved from a position where the disc 12 is placed on the disc mounting portion 26 to a position higher than a top end of the disc mounting portion 26. The disc 12 is lifted up above the disc table 26.

If the eject handle 31 arrives at the rear end of the moving range as shown in FIG. 14, the locking of the eject lever 33 at the stand-by position by the above-mentioned lever lock mechanism not shown is released. The eject lever 33 is moved forward, namely to the position shown in FIG. 15 by the biasing force applied to the eject lever 33. By the eject lever 33 being moved to the position shown in FIG. 15, the disc 12 is pressed forward, namely moved to the direction to be protruded from the opening portion 29. As a result, a part of the disc 12 is pushed out from the disc insertion portion 29 to the outside of the main body portion 25 as shown in FIG. 14.

Figure 15:
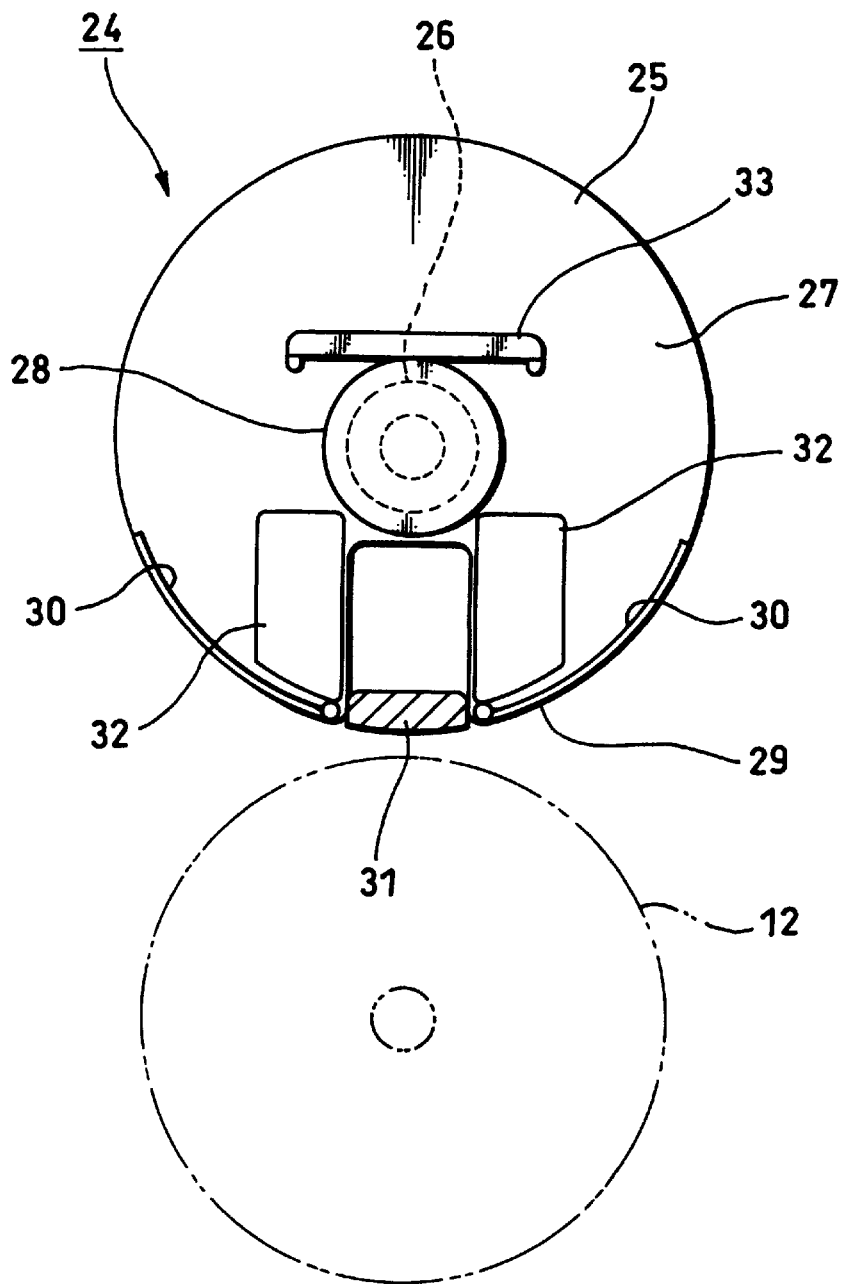
FIG. 15 is a schematic plan view showing such a state that the disc has been taken out from the main body portion.

If a part of the disc 12 pushed out to the outside of the main body portion 25 as shown in FIG. 14 is pulled out by the user's finger or hand, the disc 12 can be taken out to the outside of the main body portion 25 as shown in FIG. 15.

In the above described disc player concerning each of the embodiments of the present invention, mounting/dismounting the disc 12 on/from the main body portion 2, 14 or 25 is conducted via the opening portion 6, 18 or 29 as the disc insertion portion formed on the side face of the main body portion 2, 14 or 25. For mounting/dismounting the DISC 12, therefore, it is not necessary to largely open the insertion portion of the main body portion for the disc mounting/dismounting unlike the conventional apparatus. The strength of the main body portion is thus maintained.

Since the opening portion 6, 18 or 29 as the disc insertion portion is closed by the shutters 7 and 7, 19 and 19, or 30 and 30, entrance of trash or dust into the main body portion 2, 14 or 25 through the opening portion 6, 18 or 29 is prevented.

Furthermore, insertion/ejection of the DISC 12 into/from the main body portion 2, 14 or 25 can be conducted in substantially one operation. The operation performance is thus improved.

Furthermore, in the disc player 13 concerning the second embodiment, the disc 12 can be inserted into the main body portion 14 without moving the eject handle 21 backward and opening the disc portion 18 beforehand. That is, by merely moving the disc 12 in such a direction that it is inserted into the main body portion 14 while contacting the end portion of the insertion side of the disc 12 with end portions of the shutters 19 and 19, the shutters 19, 19 closing the opening portion 18 are moved to open the opening portion 18 and the disc 12 can be inserted into the main body portion 14. When the disc 12 is inserted into the main body portion 14 to some extent or more, the shutters 19 and 19 automatically close the opening portion 18 as the the disc insertion portion. As a result, mounting the disc 12 on the main body portion 14 is further facilitated.

In the disc player 24 concerning the third embodiment as well, without opening the disc insertion portion 29 beforehand, by inserting and pushing the disc 12 into the main body portion 25 while contacting the end portion of the insertion side of the disc 12 with one end portions of the shutters 30 and 30, the tip end portion on the rotation end sides of the shutters 30 and 30 are pressed by the outer edge of the disc 12 which is being pressed from the opening portion 29, and the shutters 30, 30 are rotated toward the open positions to open the opening portion 29. As a result, the disc 12 can be thus inserted into the main body portion 25 through the opened opening portion 29. If the disc 12 is inserted into the main body portion 24 to some extent or more, the shutters 30 and 30 automatically close the disc insertion portion 29. As a result, mounting the disc 12 on the main body portion 25 is further facilitated.

With reference to FIGS. 16 through 30, a disc player 100 concerning a fourth embodiment of the present invention will be described. The disc player 1 of the fourth embodiment is the same as the disc player 1 of the first embodiment described above in theorem and the arrangement of the first embodiment is implemented.

A disc player 100 has a lower case 111 and an upper case 112 forming an exterior casing of a main body portion 110. By uniting these two cases 111 and 112, the exterior casing having an internal disposition space is formed.

Figure 17:
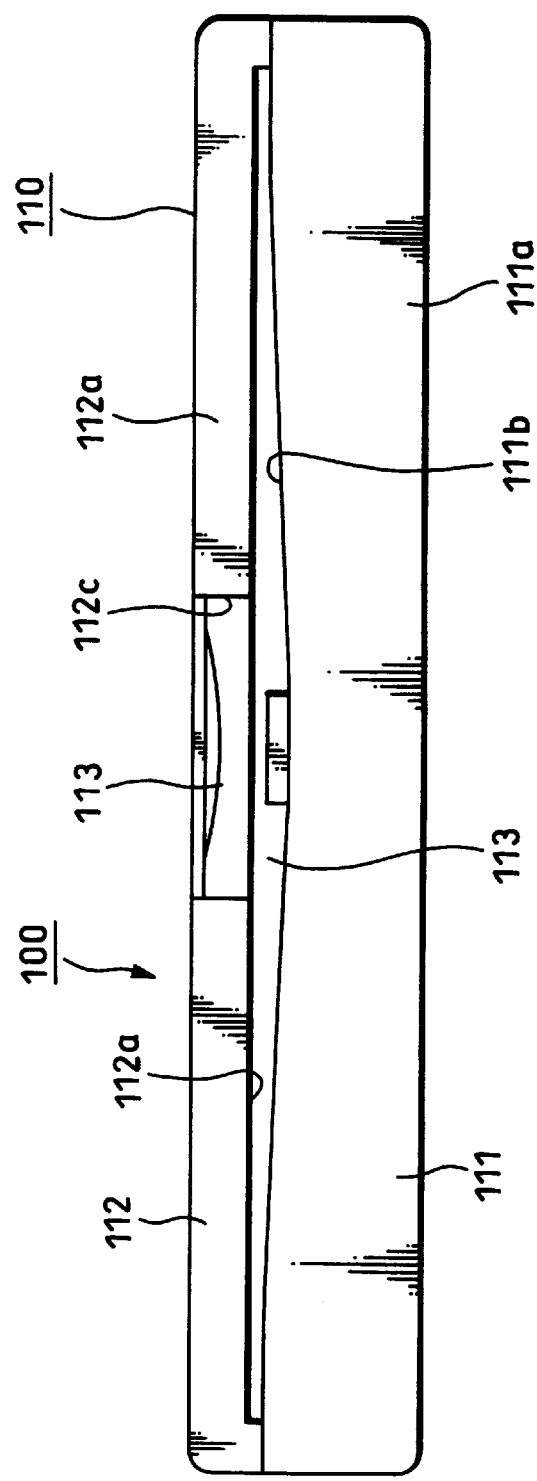
FIG. 17 is a front view in such a state that a disc insertion portion is opened.

The lower case 111 is formed to be of a shallow circular dish shape. As shown in FIG. 17, over a part of a front end portion of a peripheral wall portion 111a of the lower case 111 determining a center angle of approximately 120 degrees, an upper edge portion 111b thereof is made lower than the upper edge portion of the other part. In addition, the upper edge portion 111b is inclined so that it may become the lowest in the front end and it may become higher as it is distant apart from the front end.

Figure 16:
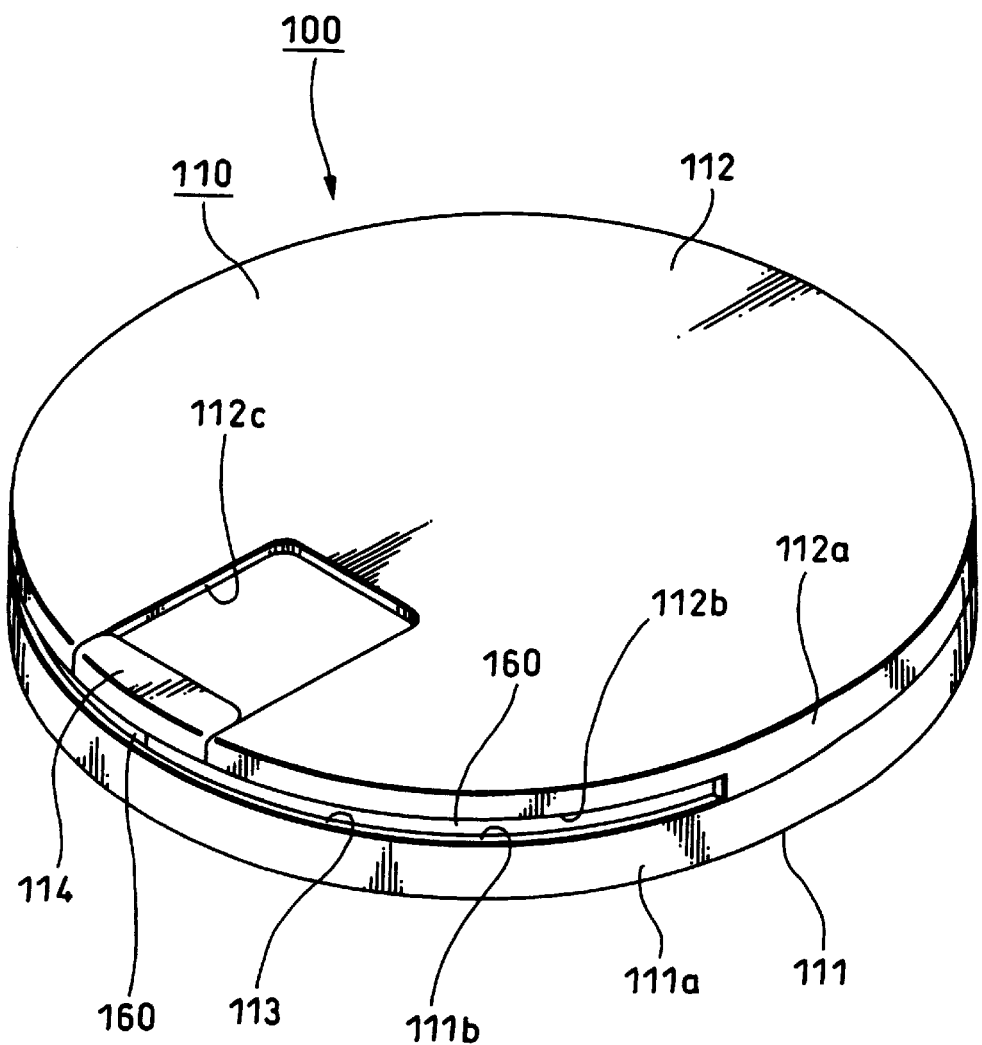
FIG. 16 shows a disc player concerning a fourth embodiment of the present invention together with FIGS. 17 through 31 and is a schematic perspective view of the disc player.

As shown in FIG. 16, the upper case 112 is formed to be of a circular dish shape which is shallower than the lower case 111. For a part of a front end portion of a peripheral wall portion 112a of the upper case 112 determining a center angle of approximately 120 degrees, a lower edge portion 112a is notched shallowly. As shown in FIGS. 16 and 17, by the front end portion 111b of the peripheral wall portion 111a of the lower case 111 and the front end portion 112b of the peripheral wall portion 112a of the upper case 112, a disc insertion portion 113 which is an opening for communication between the inside and outside of the exterior casing is formed.

In the front end portion of the upper case 112, as shown in FIG. 16, a rectangular notch 112c opening forward is formed. In order to open and close the notch 112c, an eject handle 114 is supported on the upper case 112 so as to be freely slidable in the forward and backward direction as indicated by an arrow in FIG. 16.

Figure 18:
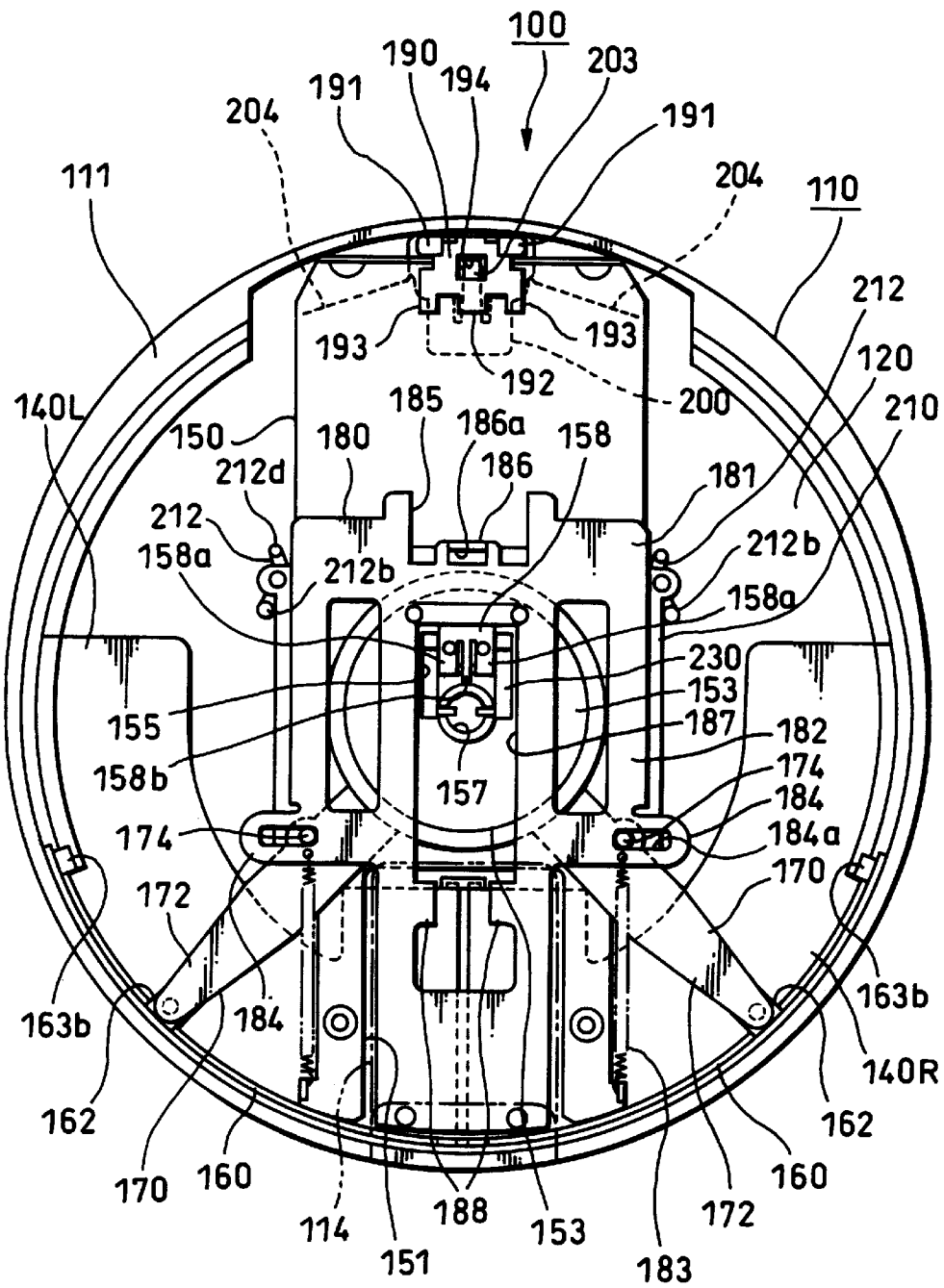
FIG. 18 is a schematic plan view in such a state that an upper case is removed.
Figure 19:
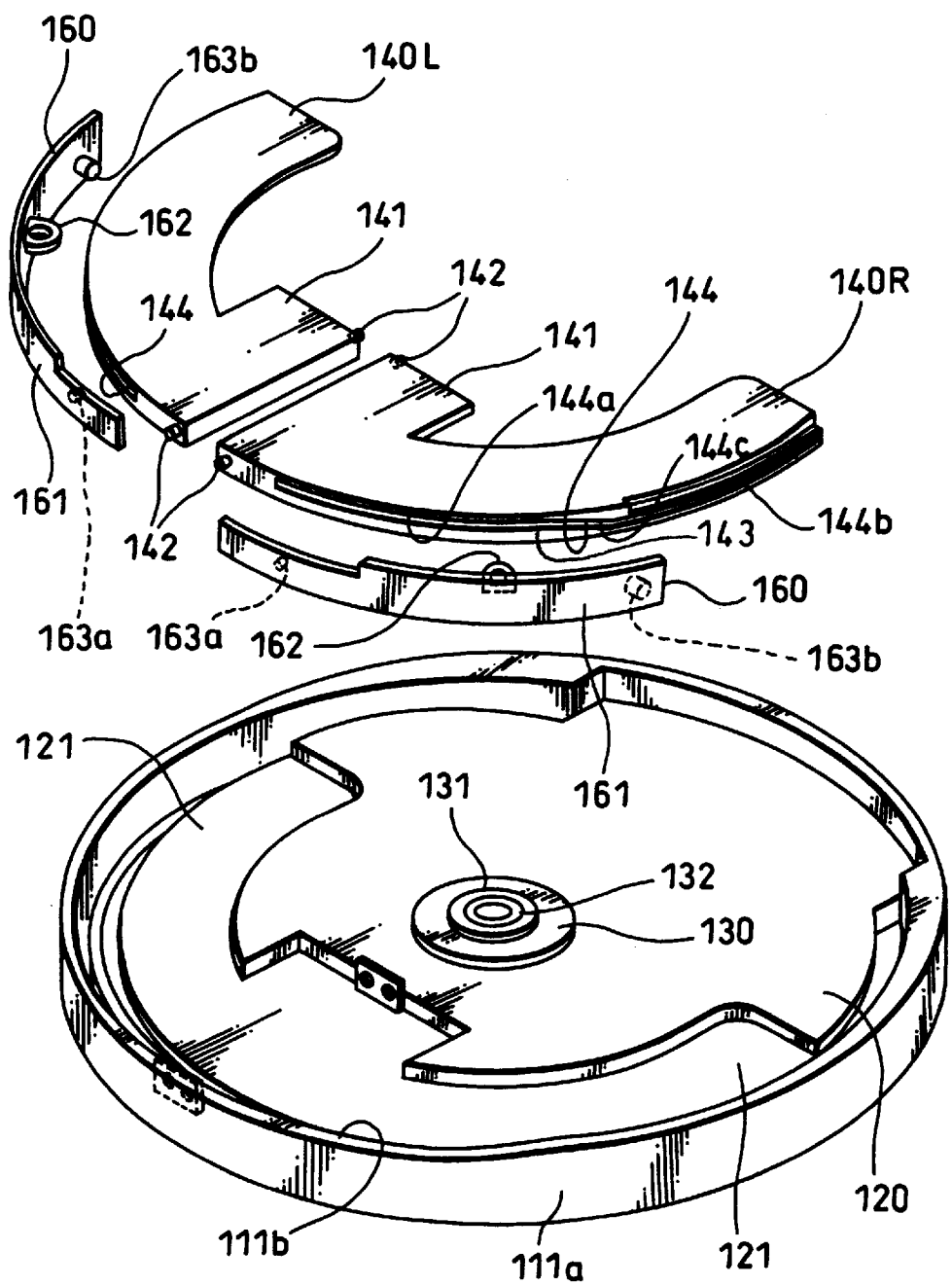
FIG. 19 is a schematic exploded perspective view showing a lower case and principal components disposed thereon.
Figure 20:
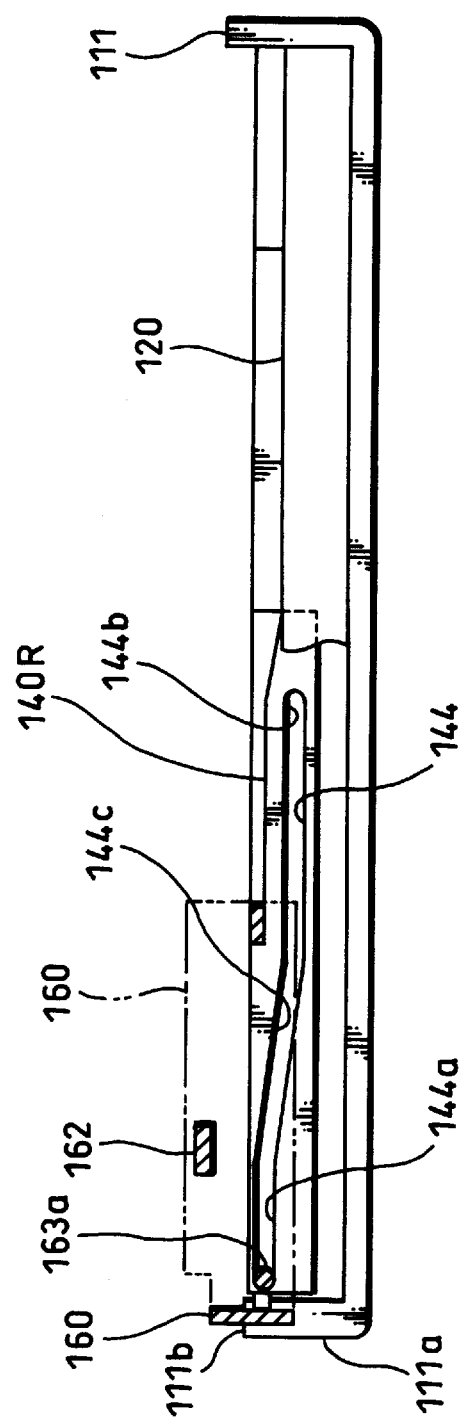
FIG. 20 is a partially cutaway side view with the upper case removed, in such a state that the shutters are at blocking positions.
Figure 21:
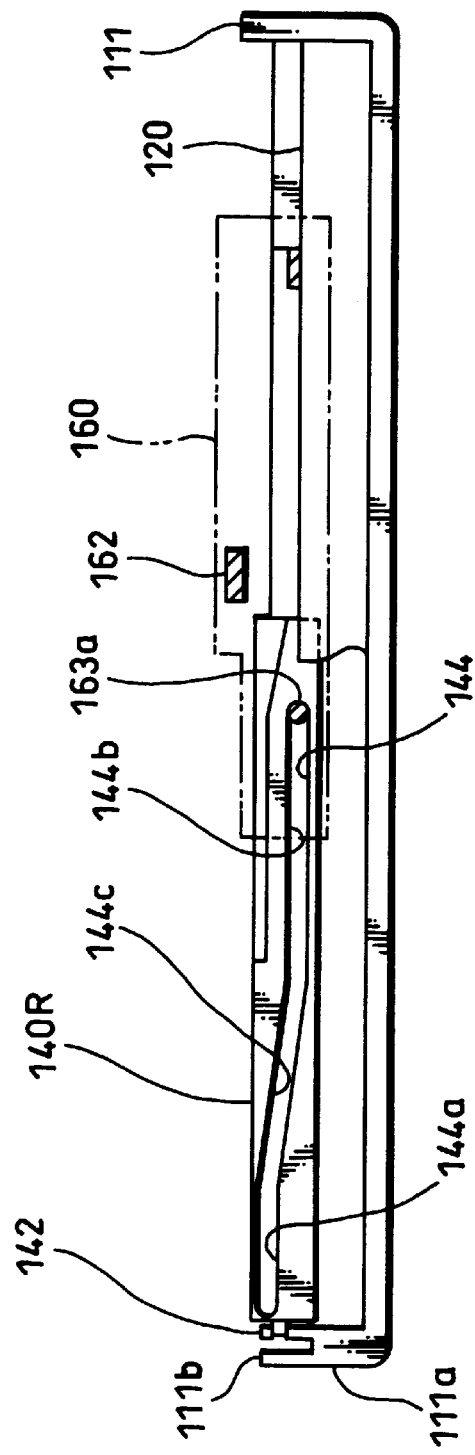
FIG. 21 is a partially cutaway side view with the upper case removed, in such a state that the shutters are at open positions.
Figure 22:
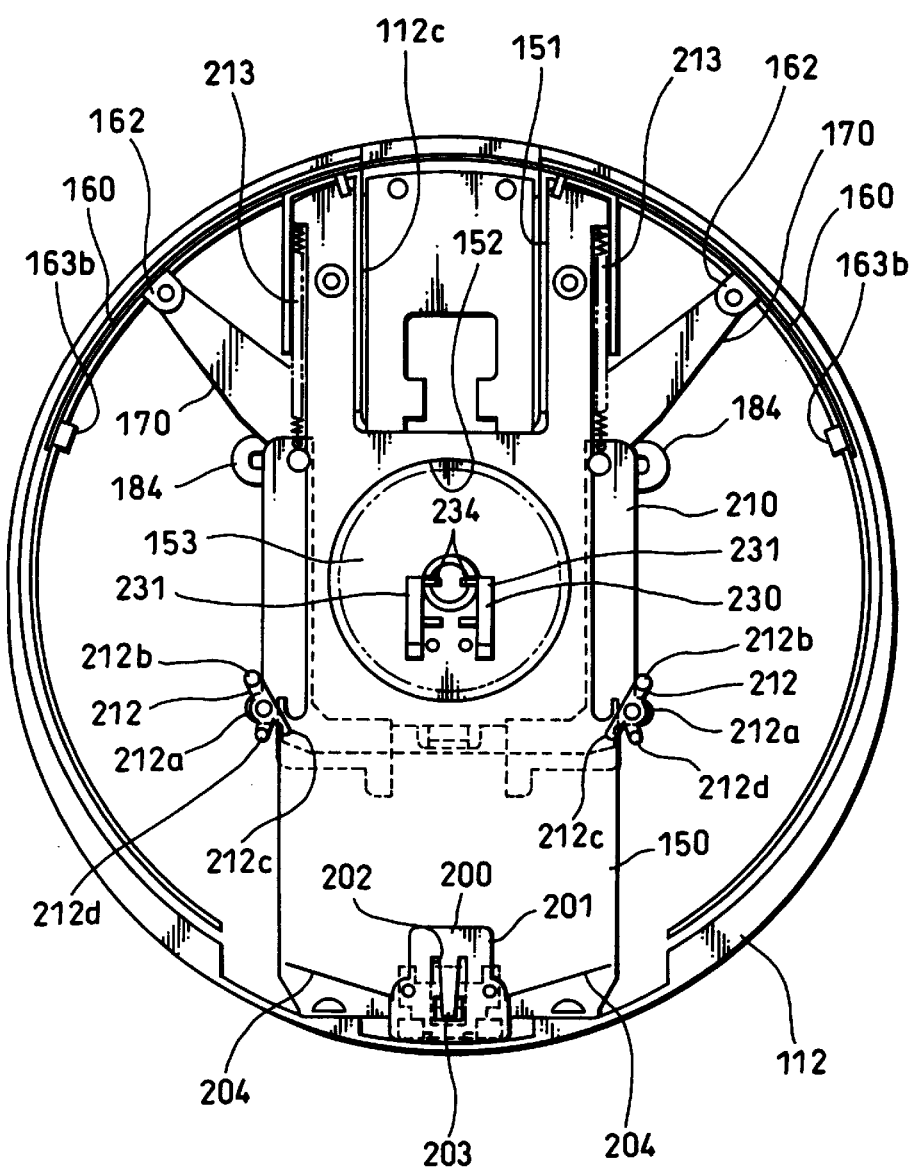
FIG. 22 is a bottom view showing an initial state of the upper case and a mechanism portion supported by the upper case.

As shown in FIGS. 19 or 18, within the lower case 111, a chassis 120 is disposed. At a substantially central part of the chassis 120, a disc table 130 rotated by a spindle motor which is not illustrated is disposed as a disc mounting portion. On the upper face of the disc table 130, i.e., in a central part of a disc mounting face, a positioning projection 131 is formed in a protruding fashion. To the positioning projection 131, a magnet 132 is attached so as to be buried.

On the chassis 120, necessary mechanisms and members such as an optical pickup and a feeding mechanism of the optical P 3 pickup, which are not illustrated, are disposed. While moving in a radial direction of a disc mounted on the disc table 130 and rotated, the optical pickup reads the data recorded on the disc.

As shown in FIGS. 18 and 19, at the front end portion of the chassis 120, chassis covers 140L and 140R are disposed. The chassis covers 140L and 140R take shapes which are bilaterally symmetric to each other. Therefore, one of the chassis covers 140L and 140R will be described in detail. The chassis cover 140L is planar and it takes the shape of a strip of a circular arc. At a rear edge of its right end, the chassis cover 140L has a projection piece 141 projecting backward. From a right end of an outer peripheral edge of the chassis cover 140L and a right end of a rear edge of the projection piece 141, support pins 142 and 142 are projected. Furthermore, on the outer peripheral edge of the chassis cover 140L, a wall portion 143 is provided perpendicular substantially. On the wall portion, 143, a cam groove 144 is formed. Of the cam groove 144, a portion 144a of its former half (a front side horizontal portion) extends in a substantially horizontal direction in an upper part and a rear portion 144b occupying substantially one third of the cam groove 144 (a rear side horizontal portion) extends in the horizontal direction in a lower part. A rear end of the front horizontal portion 144a is coupled to a front end of the rear horizontal portion 144b via an inclined portion 144c falling backward.

As shown in FIG. 19, in left and right side parts of a forward portion in a top face of the chassis 120, shallow depressions 121 and 121 corresponding to the planar shapes of the chassis covers 140L and 140R are formed. The chassis covers 140L and 140R are disposed within the depressions 121 and 121. The support pins 142 and 142 of the chassis covers 140L and 140R are supported by the chassis 120 and the peripheral wall portion 111a of the lower case 111 so as to be freely rotatable. As a result, the chassis covers 140L and 140R are supported so as to be freely rotatable in the upward and downward direction.

In such a state that the chassis covers 140L and 140R are located at lower ends of their rotation ranges, the top faces of chassis covers 140L and 140R are located at substantially the same height as the top face of the chassis 120. The upper face of the disc table 130, i.e., the disc mounting face of the disc table 130 is located at a position higher than the top face of the chassis 120. When the chassis covers 140L and 140R are located at top ends of their rotation ranges, rear ends of their outer peripheral edges are located at positions higher than a top end of the positioning projection 131 of the disc table 130.

Figure 23:
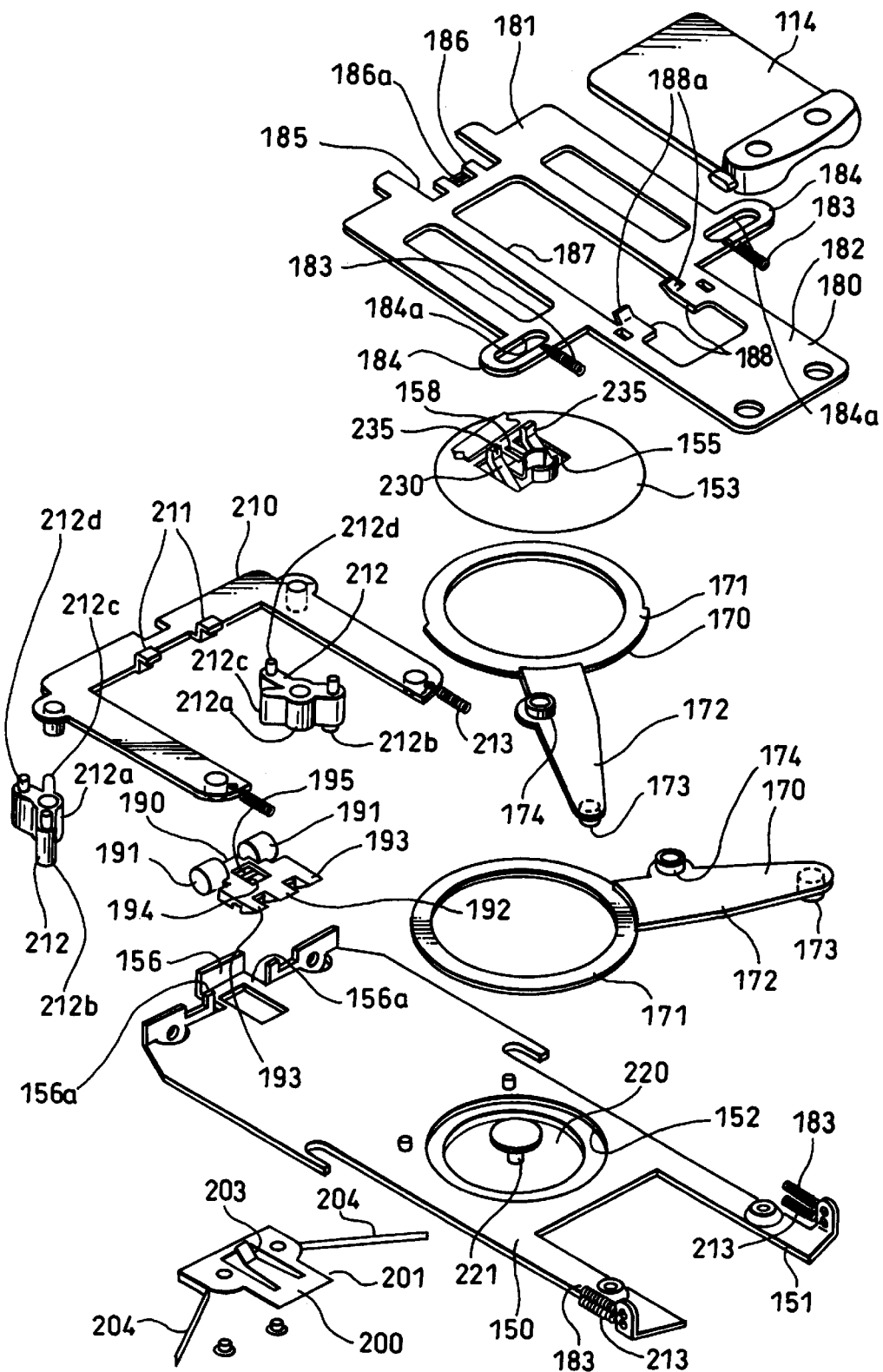
FIG. 23 is a schematic exploded perspective view of the mechanism portion supported by the upper case.

As shown in FIGS. 18 and 23, to a lower face of the upper case 112, an eject chassis 150 made of sheet metal is fixed so as to extend under a central part of the upper case 112 forward and backward. In a front end portion of the eject chassis 150, a notch 151 taking the shape of substantially a rectangle is formed so as to open at the front end. The notch 151 is disposed so as to substantially coincide with the notch 112c of the upper case 112.

At substantially a central part of the eject chassis 150, a circular opening 152 is formed. An eject chassis shaft 153 with the shape of a disc having some what thickness is attached to an upper face of the eject chassis 150 so as to cover the opening 152.

As shown in FIGS. 16 and 19, shutters 160 and 160 are disposed so as to open and close the disc insertion portion 113. These shutters 160 and 160 take shapes which are bilaterally symmetric to each other. Therefore, one of them will be described in detail. The shutter 160 takes the shape of a strip. The shutter 160 has a main portion 161. When viewed from above in its thickness direction, the main portion 161 is curved like a circular arc. At the top of a central portion in the forward and backward direction of the main portion 161, a coupling piece 162 is formed so as to be projected from a concave face of a curve. On the same face as the face from which the coupling piece 162 is projected, two engagement pins 163a and 163b are projected at distances from the coupling piece 162 in the forward and backward direction.

In such a state that lower halves of the main portions 161 and 161 are located in a gap between the chassis 120 and the peripheral wall portion 111a of the lower case 111, the shutters 160 and 160 are disposed so as to be freely slidable. The engagement pins 163a and 163a on the front side are engaged with the cam grooves 144 and 144 of the chassis covers 140L and 140R so as to be freely slidable. In such a state that these shutters 160 and 160 are located at closing positions for closing the disc insertion portion 113, the engagement pins 163b and 163b on the rear side are made to be located at rear portions of outer side edges of the chassis covers 140L and 140R.

In such a state that these shutters 160 and 160 are located at closing positions for closing the disc insertion portion 113, the engagement pins 163a and 163a on the front side are engaged with the front horizontal portions 144a and 144a of the cam grooves 144 and 144 of the chassis covers 140L and 140R. As a result, the chassis covers 140L and 140R are located at the lower ends of their rotation ranges, and the top faces of the chassis covers 140L and 140R are located at positions lower than the disc mounting face of the disc table 130. In other words, there is presented such a state that the disc is mounted on the disc mounting surface of disc table 130.

While the shutters 160 and 160 moves from the closing position of the disc insertion portion 113 to the open position for opening the disc insertion portion 113, the engagement pins 163a and 163a on the front side of the shutters 160, 160 relatively move in the cam grooves 144 and 144 from the front horizontal portions 144a and 144a to the inclined portion 144c and 144c, and further to the rear horizontal portions 144b and 144b. During this time, therefore, the chassis covers 140L and 140R arrive at the top ends of their rotation ranges, and the outer peripheral edge portions of the chassis covers 140L, 140R are located at positions higher than the top end of the positioning projection 131 of the disc table 130. In other words, the disc mounted on the disc mounting surface of the disc table 130 is lifted up from the disc mounting surface of disc table 130.

As shown in FIGS. 18 and 23, the shutters 160 and 160 are moved by drive levers 170 and 170 respectively.

In the drive levers 170 and 170, arm portions 172 and 172 are projected from toroidal base portions 171 and 171. Coupling pins 173 and 173 are projected from the lower faces of tip ends of the arm positions 172 and 172. On the upper faces of parts of the arm portions 172 and 172 located near the base portions, driven pins 174 and 174 are projected.

The base portions 171, 171 of the drive levers 170 and 170 are fitted around the eject chassis shaft 153 so as to be freely rotatable. The coupling pins 173 and 173 are coupled to the coupling pieces 162 of the shutters 160 and 160 so as to be freely rotatable. When the driver levers 170 and 170 are rotated, therefore, the shutters 160 and 160 are moved.

As shown in FIG. 18, on the upper side of the eject chassis 150, an eject slider 180 is disposed on the upper case 112 so as to be freely slidable in the forward and backward direction with respect to the upper case.

As shown in FIG. 23, the eject slider 180 is made of sheet metal material and includes a latter half portion 181 and a former half portion 182 integrally formed. The latter half portion has a lateral width substantially equal to that of the eject chassis 150. The former half portion projects from a center of a front edge of the latter half portion 181. The former half portion has a lateral width substantially equal to half of the lateral width of the latter half portion. The former half portion 182 is fixed to a lower face of the eject handle 114. The eject handle 114 is guided by the notch 112c of the upper case 112 and is made freely movable in the forward and backward direction. When the eject handle 114 is moved, this eject slider 180 is also moved in the forward and backward direction. Between both sides of a front end portion of the latter half portion 181 in the eject slider 180 and both sides of the front end portion of the eject chassis 150, coil springs 183 and 183 are stretched. As a result, the eject slider 180 is given with forward biasing force by the coil springs 183, 183.

In the front end portion of the rear half portion of the eject slider 180, coupling pieces 184 and 184 projecting sideward are formed. In the coupling pieces 184 and 184, coupling holes 184a and 184a are formed. The coupling holes 184a, 184a are long in the left to right direction. The driven pins 174 and 174 of the drive levers 170 and 170 are engaged with the coupling holes 184a and 184a so as to be freely slidable. When the eject slider 180 moves in the forward and backward direction, the drive levers 170 and 170 are rotated, and consequently the shutters 160 and 160 are moved. In other words, in such a state that the eject slider 180 is located at a front end of its moving range, the shutters 160 and 160 are located at the closing positions to close the disc insertion portion 113. When the eject slider 180 moves backward from there, namely to the center of player 100, the drive levers 170 and 170 are rotated in such directions that front ends of them are separated from each other, and the shutters 160 and 160 are moved toward the open positions to open the disc insertion portion 113. When the eject slider 180 has arrived at a rear end of its moving range, the shutters 160 and 160 arrive at the open positions to open the disc insertion portion 113.

The eject slider 180 is locked at the rear end of its moving range by a lock lever described later. For that purpose, a notch 185 opening toward a rear end portion of the eject slider 180 is formed at a center of the rear end portion of the eject slider 180. In a central part of an inner edge of the notch 185, a locked piece 186 projecting backward is formed. In the locked piece 186, a locked hole 186a is formed.

Figure 30:
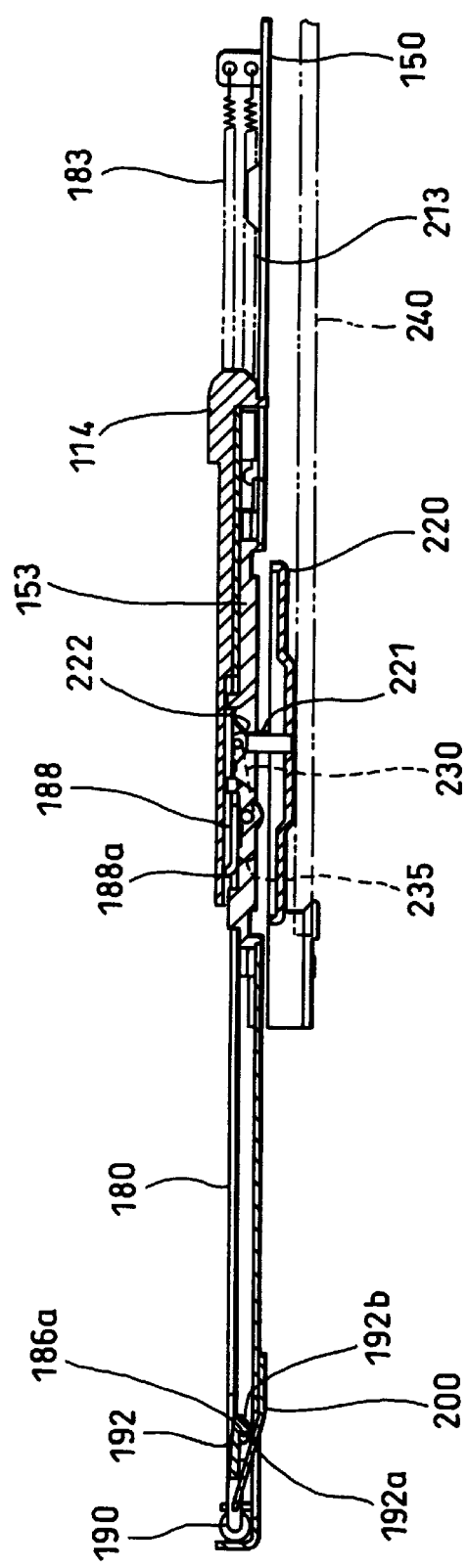
FIG. 30 is a sectional view taken along a line XXX—XXX of FIG. 28.
Figure 31:
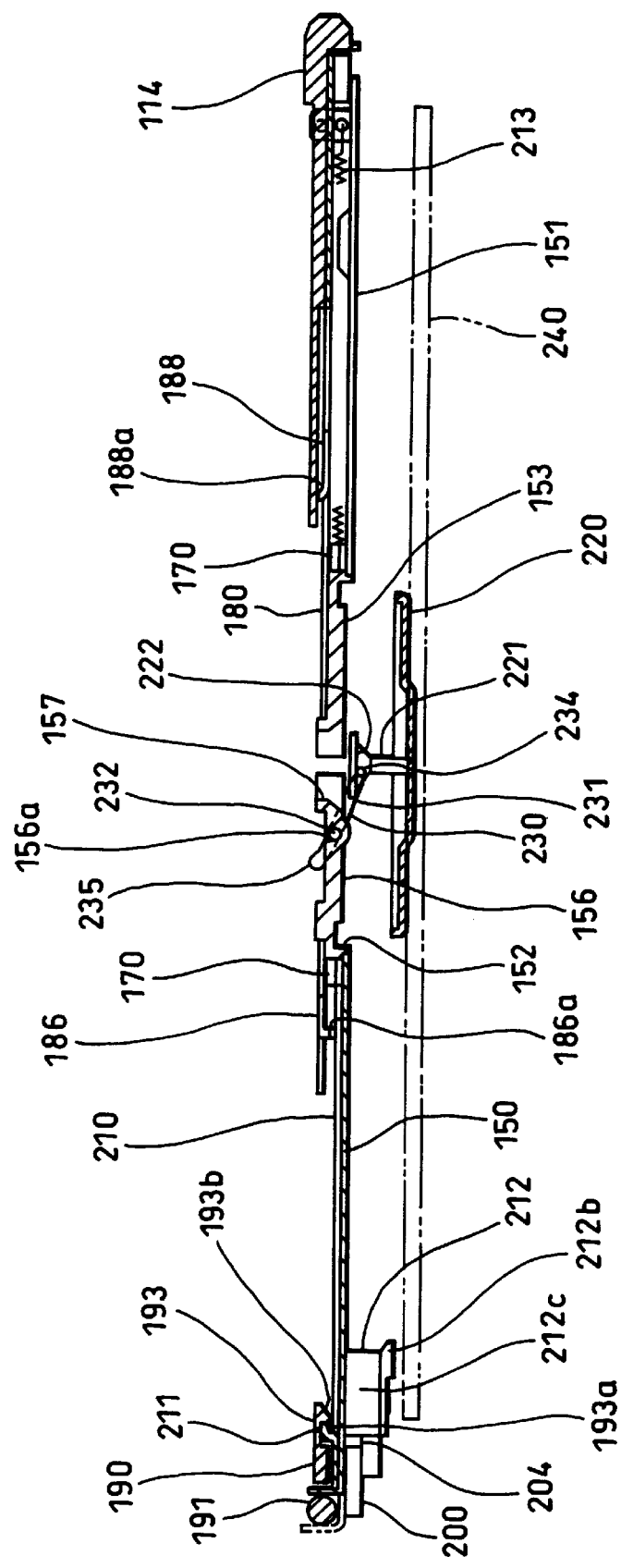
FIG. 31 is a sectional view taken along a line XXXI—XXXI of FIG. 29.

On a top face of a rear end portion of the eject chassis 150, a lock lever 190 is supported so as to be rotatable in the upward and downward direction. On both sides of a rear end portion of the lock lever 190, supported shafts 191 and 191 are formed. The supported shafts 191 and 191 are supported by the eject chassis 150 so as to be rotatable. In a front end portion of the lock lever 190, lock pieces 192, 193 and 193 projecting forward are formed. On lower faces of front ends of the lock pieces 192, 193 and 193, as shown in FIGS. 30 and 31, lock claws 192a, 193a and 193a are formed to be projected. Front faces of the lock claws 192a, 193a and 193a are formed as inclined faces 192b, 193b and 193b inclined so as to rise forward. Furthermore, substantially at a central part of the lock lever 190, an opening 194 is formed. A top face 195 of a portion continuing to a rear end of the opening 194 is formed as a pressed face. As for these lock pieces, 192, 193, 193, the lock piece 192 is formed at the central part and used to lock the eject slider 180. The lock pieces 193 and 193 are formed on both sides at distances from the central lock piece 192 used to lock an eject lever described later at its stand-by position.

As shown in FIG. 18, a lock lever spring 200 is attached to a center of the rear end portion of the eject chassis 150. The lock lever spring 200 is made of flat spring material. The lock lever spring has a main portion 201. The main portion 201 is formed to have the shape of a rectangle which is long substantially in the forward and backward direction. In the main portion 201, an opening 202 is formed. The opening takes the shape of a rectangle which is long in the forward and backward direction. A spring piece 203 projecting from a front edge of the opening 202 substantially backward is formed. A tip end of the spring piece 203 is passed upward from downward through the opening 194 of the lock lever 190 via an insertion hole 154 formed in the eject chassis 150, and is brought in contact with the pressed face 195 elastically. As a result, the lock lever 190 is subject to rotation force in such a direction that the front end of the lock lever is moved downward. Consequently, the lock claws 192*a*, 193*a* and 193*a* are in contact with a top face of the eject chassis 150.

Side spring pieces 204 and 204 projecting sideward from both sides of the main portion 201 of the lock lever spring 200 are formed. As the side spring pieces 204, 204 are advanced sideward, they are displaced forward. In addition, the side spring pieces have impact resilient force in the forward and backward direction.

Figure 26:
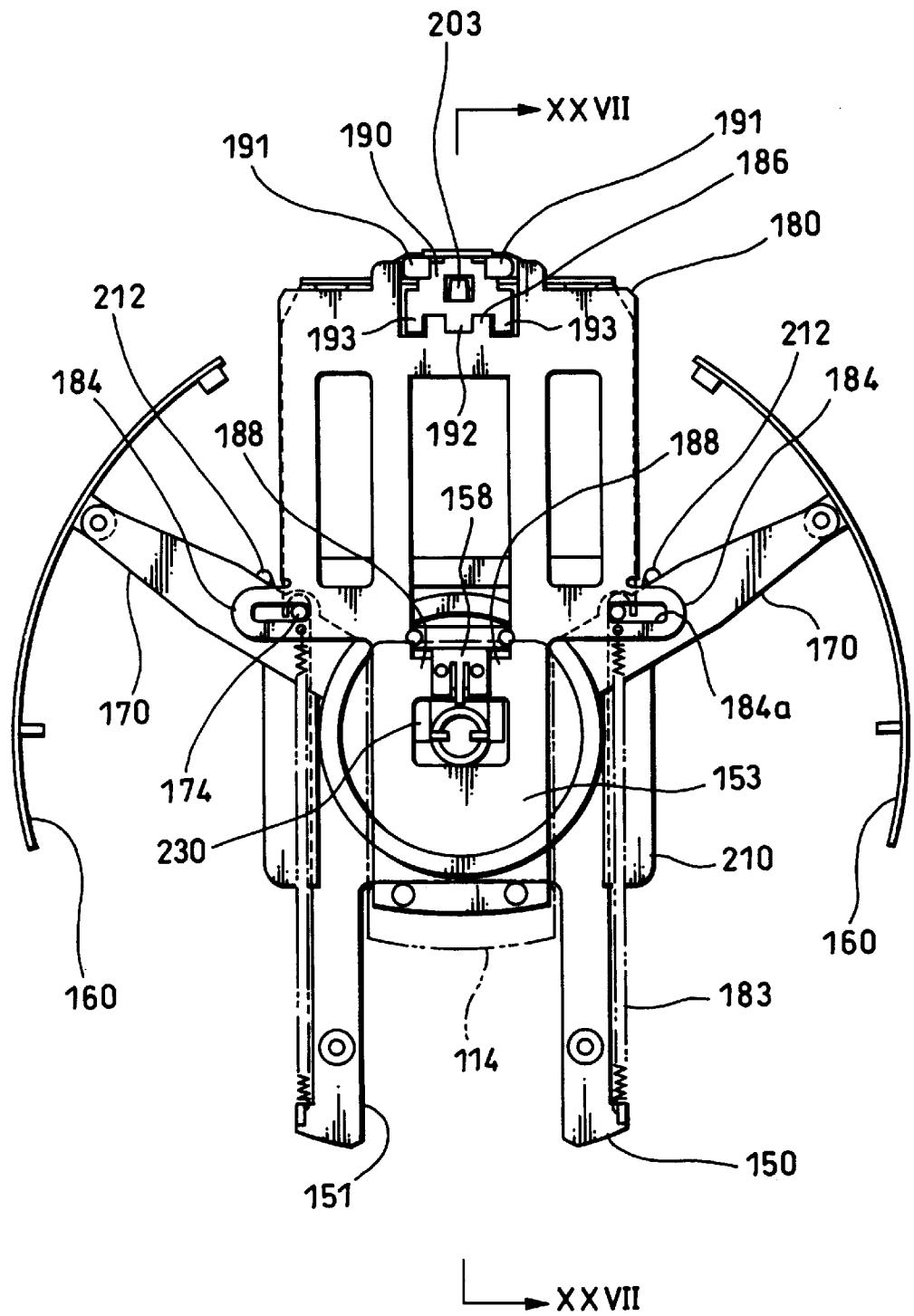
FIG. 26 is a plan view showing the mechanism portion in such a state that the shutters are in the open positions.

If, as shown in FIG. 26, the eject slider 180 is moved backward and the eject slider 180 arrives at a position located immediately before the rear end of its moving range, then a rear edge of the locked piece 186 comes in contact with the inclined face 192*b* of the lock claw 192*a* located at the center of the lock lever 190. The rear edge of the locked piece 186 thus presses the inclined face 192*b*. Against the rotation force given by the spring piece 203 of the lock lever spring 200, therefore, the lock lever 190 rotates upward. As a result, a rear end portion of the locked piece 186 of the eject slider 180 passes through the position of the lock claw 192*a* backward. When the locked hole 186*b* is associated with the lock claw 192*a*, the lock lever 190 rotates downward and its lock claw 192*a* engages with the locked hole 186*a*, and the eject slider 180 is locked at the rear end of the moving range of the eject slider 180.

Figure 29:
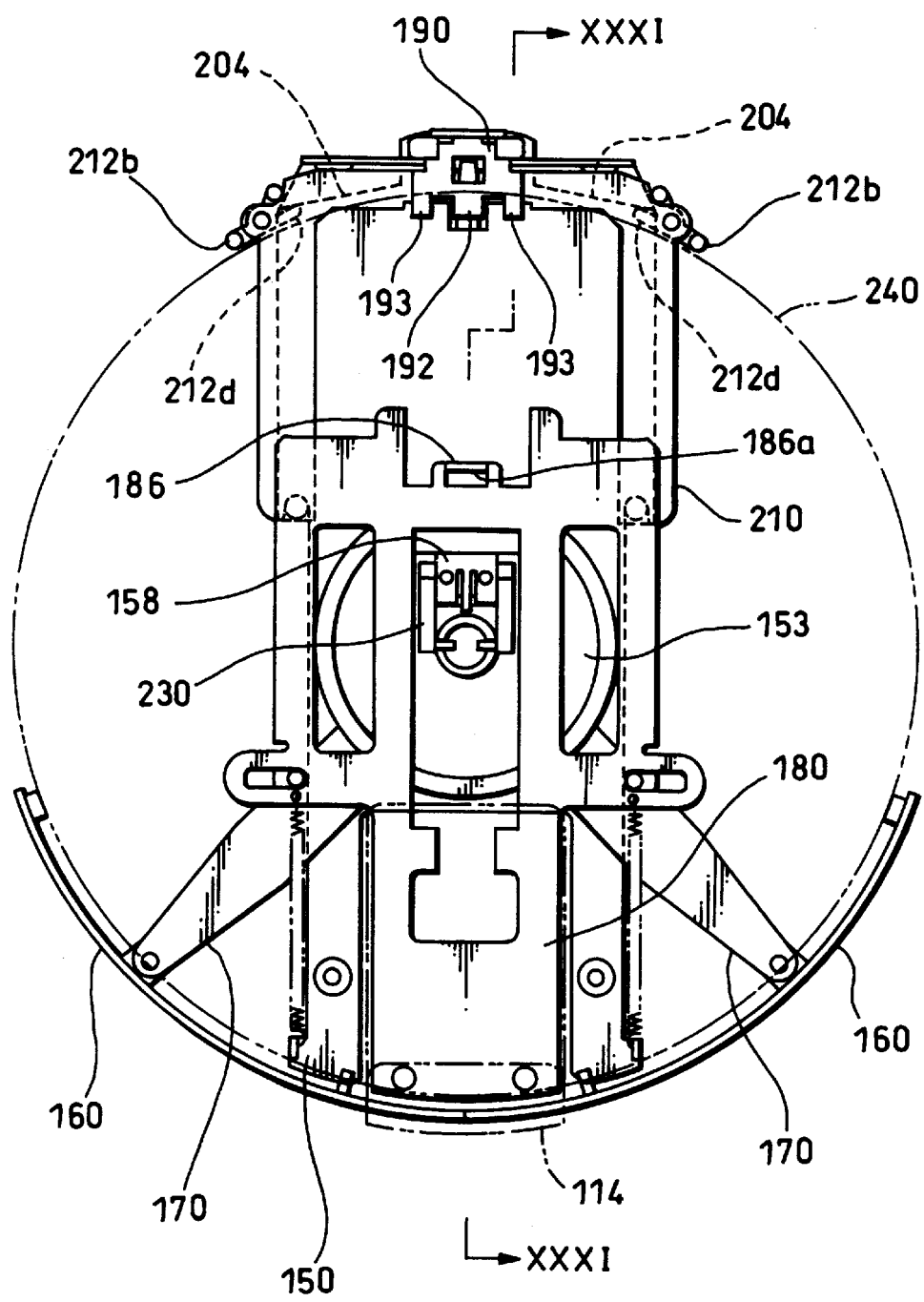
FIG. 29 is a plan view showing the mechanism portion in such a state that the eject lever is locked at a stand-by position.

As shown in FIG. 18, at a position located between the eject chassis 150 and the eject slider 180, an eject lever 210 is supported so as to be movable in the forward and backward direction, namely between the positions shown in FIGS. 26 and 29.

The eject lever 210 is made of a sheet metal material as shown in FIG. 23. The eject lever 210 is a U-shaped concave shape opened forward. In a portion of a rear end extending in the lateral direction, locked pieces 211 and 211 are formed at a central part of a front edge of its portion extended in the left to right direction so as to be separated from each other and projected upward.

On lower faces of both sides of a rear end portion of the eject lever 210, disc stoppers 212 and 212 are supported so as to be rotatable. The disc stoppers 212 and 212 take shape which are bilaterally symmetric to each other. Therefore, one disc stopper 212 thereof will be described in detail. The left side disc stopper 212 includes a supported portion 212*a* having an axis extending in the upward and downward direction and taking the shape of a cylinder, a contact piece 212*b* projected from the supported portion 212*a* substantially left-forward, a projection piece 212*c* projected from the supported portion 212*a* substantially left-backward, and an elastically contacted piece 212*d* projected from the supported portion 212*a* substantially right-backward. The supported portion and the pieces, are integrally formed. Each of tip ends of the contact piece 212*b* and the projection piece 212*c* is projected upward.

The supported portions 212*a* and 212*a* of the disc stoppers 212 and 212 are supported by the lower face of the rear end portion of the eject lever 210 so as to be freely rotatable. In the disc stoppers 212 and 212, portions of the tip ends of the contact pieces 212*b* and 212*b* projected upward are prevented from further rotating from positions where they are in contact with side edges of the eject lever 210 in directions of closer contact. The portions of the tip ends of the projection pieces 212*c* and 212*c* projected upward are prevented from further rotating from positions where they are in contact with side edges of the eject chassis 150 in directions of closer contact.

Between tip end portions of portions of the eject lever 210 extending in the forward and backward and both sides of the tip end portion of the eject chassis 150, tension coil springs 213 and 213 are stretched and disposed. The eject lever 210 is based in the front direction. When the laterally extending portion of the eject lever 210 comes into contact with outer peripheral edges of the drive levers 170 and 170 which are engaged with the eject chassis shaft 153, the eject lever 210 is prevented from moving further forward. (This position of the eject lever 210 is referred to as "eject position.")

The eject lever 210 is locked at a rear end of its moving range shown in FIG. 29, i.e., in a stand-by position by the lock lever 190. In other words, when the eject lever 210 is moved backward and arrives at a position located immediately before the stand-by position, the locked pieces 211 and 211 thereof come into contact with the inclined faces 193*b* and 193*b* of the lock claws 193*a* and 193*a* of the lock lever 190. When the eject lever 210 moves further backward from there, the locked pieces 211 and 211 thereof press the inclined faces 193*b* and 193*b*, the lock lever 190 rotates upward, and the locked pieces 211 and 211 can pass through the lock claws 193*a* and 193*a*, and move further backward. When the locked pieces 211 and 211 pass through the lock claws 193*a* and 193*a* backward, the lock lever 190 rotates downward and the lock claws 193*a* and 193*a* engage with front sides of the locked pieces 211 and 211 and the eject lever 210 is locked at the stand-by position.

Figure 25:
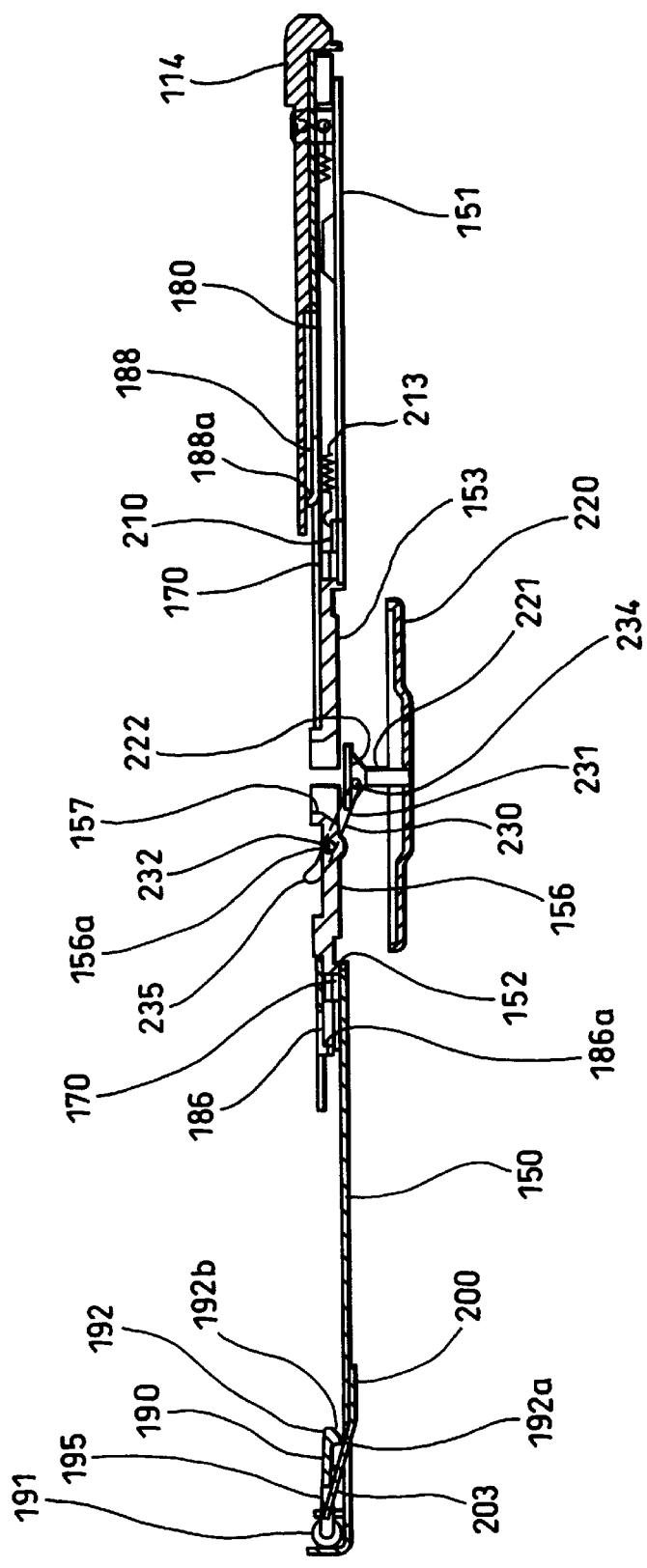
FIG. 25 is a sectional view taken along a line XXV—XXV of FIG. 24.

As shown in FIGS. 23 and 25, on the lower side of the eject chassis shaft 153, a chucking plate 220 is disposed as a chucking mechanism. The chucking plate 220 is made of a magnetic metal material, and formed substantially as a circular disc. From a central part of the upper face of the chucking plate 220, a short columnar projection 221 is projected. On the projection 221, an annular supported groove 222 is formed.

As shown in FIG. 18, by the eject chassis shaft 153, a disc pressing lever 230 is supported so as to be rotatable. The disc holding lever 230 is planar and substantially H-shaped. Two arm pieces 231 and 231 extending in the forward and backward direction are coupled by a portion 232. The portion 232 is used as a supported shaft. An elastically contacted portion 233 is formed so as to be projected obliquely upward in the forward direction from a central part of the supported shaft 232.

In front end portions of the arm pieces 231 and 231, as shown in FIG. 25 support pins 234 and 234 projected in such directions that they approach each other are formed. At rear end portions of the arm pieces 231 and 231, pressed portions 235 and 235 projecting upward are formed.

In the eject chassis shaft 153, a substantially U-shaped notch 155 opening backward is formed. A portion 156 located between portions of the notch 155 extending in the forward and backward direction is used as a support portion. On a top face of the support portion 156, a support groove 156*a* extending in the lateral direction is formed. In a center (corresponding to a center of the eject chassis shaft 153) of a laterally extending portion of the notch 155, a circular opening 157 is formed.

Figure 27:
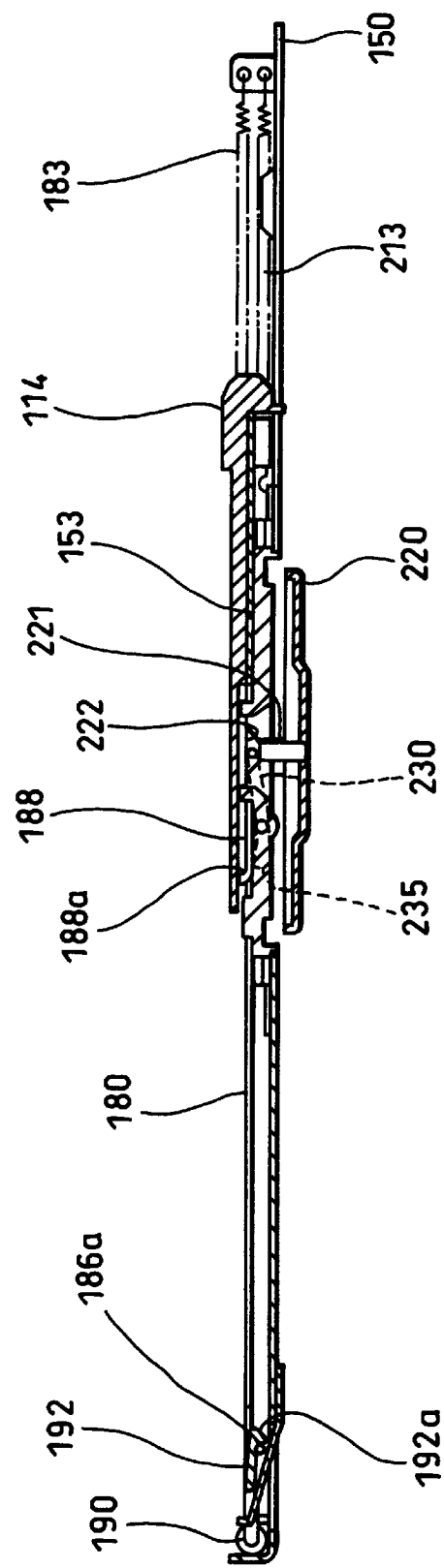
FIG. 27 is a sectional view taken along a line XXVII—XXVII of FIG. 24.

The supported shaft 232 of the disc pressing lever 230 is supported by the support groove 156*a* of the support portion 156 of the eject chassis shaft 153. In such a state that the arm pieces 231 and 231 are located in a portion of the notch 155 extending in the forward and backward direction and the support pins 234 and 234 are located in a portion of the notch 155 extending in the lateral direction, as shown in FIGS. 25 and 27, the disc pressing lever 230 is made to be freely rotatable in the upward and downward direction.

On the upper face of the eject chassis shaft 153, a pressing spring 158 is fixed. The pressing spring 158 is made of plate spring material. The pressing spring 158 is planar and is substantially E-shaped. Pieces 158a and 158a located on both sides of the pressing spring 158 are used as pressing pieces. A central piece is used as a biasing piece 158b. The pressing pieces 158a and 158a press both side portions of the supported shaft 232 of the disc pressing lever 230 from above, and the supported shaft 232 is prevented from falling off the support groove 156a. The tip end portion of the biasing piece 158b elastically contacts the elastically contacted portion 233 of the disc pressing lever 230 from above, and the disc pressing lever 230 is subject to rotation biasing in such a direction that its front end, i.e., the portion having the support pins 234 and 234 formed therein moves downward.

When the support pins 234 and 234 of the disc pressing lever 230 are slidably engaged with the supported groove 222 of the chucking plate 220, the chucking plate 220 is supported by the disc pressing lever 230 so as to be rotatable.

In the eject slider 180, a long rectangular opening 187 is formed. The opening 187 extends in a central part of the eject slider 180 in the forward and backward direction. Owing to the opening 187, interference with the disc pressing lever 230 can be avoided. From both side edges of the opening 187 located nearer to a front end of the opening 187, control pieces 188 and 188 are projected. Rear end portions 188a and 188a of the control pieces 188 and 188 are formed so as to project obliquely upward in a slightly backward direction.

Mounting a disc 240 such as a so-called compact disc or the like on the disc player 100 will now be described.

Figure 24:
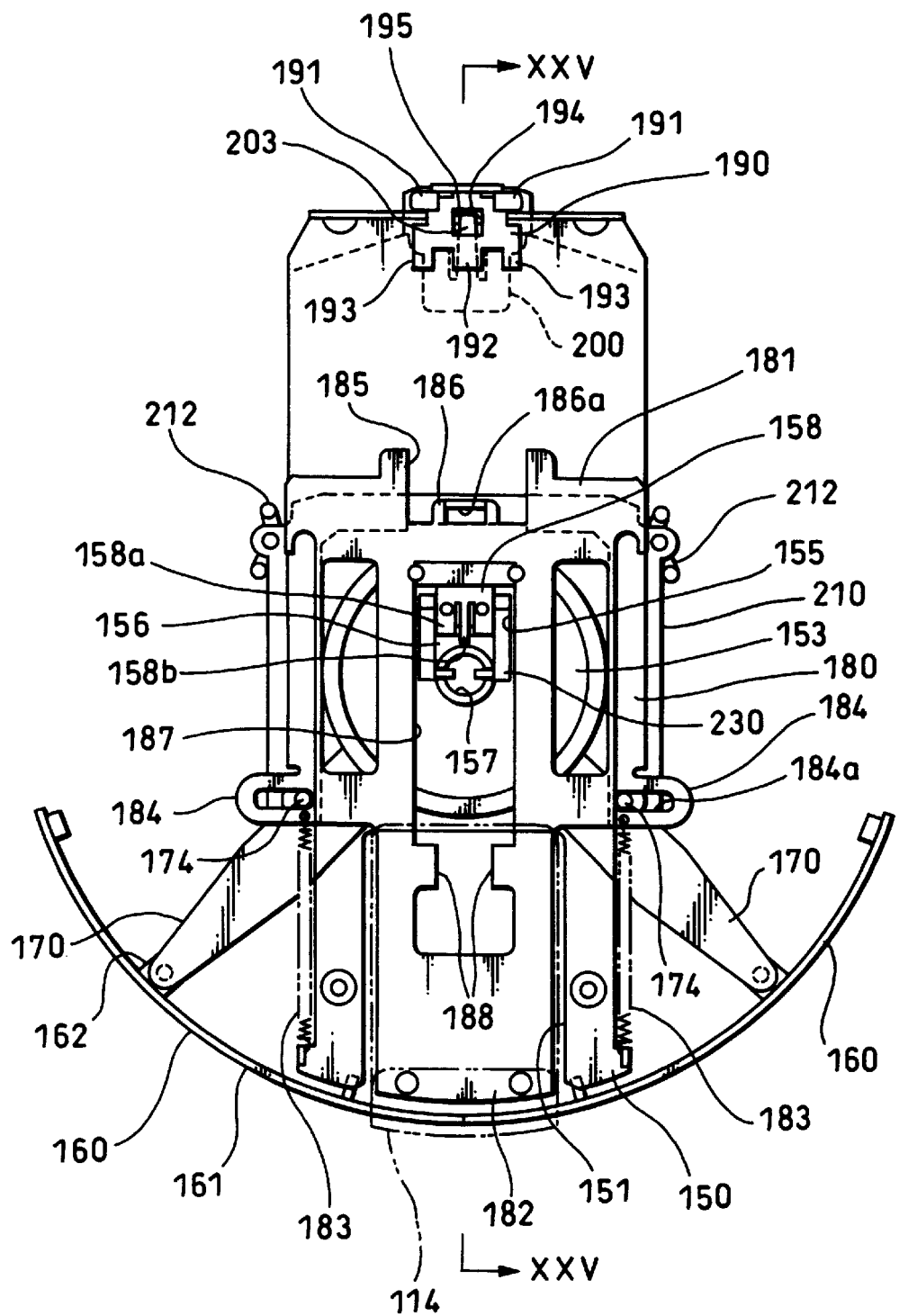
FIG. 24 is a plan view showing an initial state of the mechanism portion.

First of all, the eject handle 114 is moved backward from the position shown in FIG. 24, namely to the center of players 100 of arrows in FIG. 16. By moving the eject handle 114, the eject slider 180 fixed to the eject handle 114 is also moved backward. When the eject slider 180 is moved backward, the driven pins 174 and 174 of the drive levers 170 and 170 engaged with the coupling holes 184a and 184a of the eject slider 180 so as to be freely slidable are pressed backward. When the driven pins 174 and 174 are pressed backward, the drive levers 170 and 170 are rotated in such directions that tip ends of them are separated from each other. The shutters 160 and 160 coupled to the coupling pins 173 and 173 are moved to the open positions to open the disc insertion portion 113.

If the eject slider 180 arrives at the rear end of its moving range as shown in FIG. 26, then the lock claw 192a of the lock lever 190 engages with the locked hole 186a as mentioned above, and the eject slider 180 is locked at the rear end position of its moving range.

If the eject slider 180 is moved backward, then the rear end portions 188a and 188a of the control pieces 188 and 188 press the pressed portions 235 and 235 of the disc pressing lever 230 from above to move the pressed portions 235, 235 of the disc pressing lever 230 downward. When the pressed portions 235 and 235 are moved downward, the front end of the disc pressing lever 230, i.e., the portions having the support pins 234 and 234 located thereat are rotated so as to be moved upward from the position shown in FIG. 25. Therefore, the chucking plate 220 supported by the support pins 234 and 234 is moved upward. Thus, a gap is generated between the chucking plate 220 and the upper end of the disc table 130. In such a state that the eject slider 180 arrives at the rear end of its moving range, the control pieces 188 and 188 thereof are located over the pressed portions 235 and 235 of the disc pressing lever 230 and the control pieces continue to press the pressed portions downward. Therefore, as shown in FIG. 27, the chucking plate 220 remains moved upward.

Together therewith, as shown in FIG. 26, the shutters 160 and 160 arrive at the open positions to open the disc insertion portion 113, and the disc insertion portion 113 is opened.

While the shutters 160 and 160 move from the closing positions to close the disc insertion portion 113 to the open positions, the engagement pins 163a and 163a of the front sides of the shutters 160, 160 move in the cam grooves 144 and 144 of the chassis covers 140L and 140R from the horizontal portion 140a on the front end side to the horizontal portion 144b on the rear end side, and the chassis covers 140L and 140R rotate so that end portions of the chassis covers, i.e., the left end portion of the left-side chassis cover 140L and the right end portion of the right-side chassis cover 140R may rise, respectively. As a result, portions of the outer peripheral edges of the chassis covers 140L and 140R corresponding to the disc table 130 in the forward and backward direction are located at positions higher than the top end of the positioning projection 131 of the disc table 130. As the positions proceed from the front end to the rear end, the outer peripheral edges of the chassis covers 140L and 140R becomes gradually high.

The disc 240 is now inserted from the disc insertion portion 113 into the main body portion 110. At this time, the lower opening edge 111b of the disc insertion portion 113 is inclined so that it may become higher as the positions proceed backward from the front end as shown in FIG. 17. Therefore, only the outer peripheral edge of the disc 240 comes into contact with the opening edge 111b. As a result, the signal recording face of the disc 240 is prevented from coming into contact with the opening edge 111b and being damaged.

The outer peripheral edges of the chassis covers 140L and 140R are inclined so as to rise backward. While the outer peripheral edge of the disc 240 is sliding along the outer peripheral edges of the chassis covers 140L and 140R, therefore, the disc 240 is gradually moved upward and passed over the disc table 130. Thus, the disc 240 does not interfere with the disc table 130.

The chucking plate 220 has already been moved upward as described above, so that the chucking plate 220 does not interfere with the disc 240, either.

Figure 28:
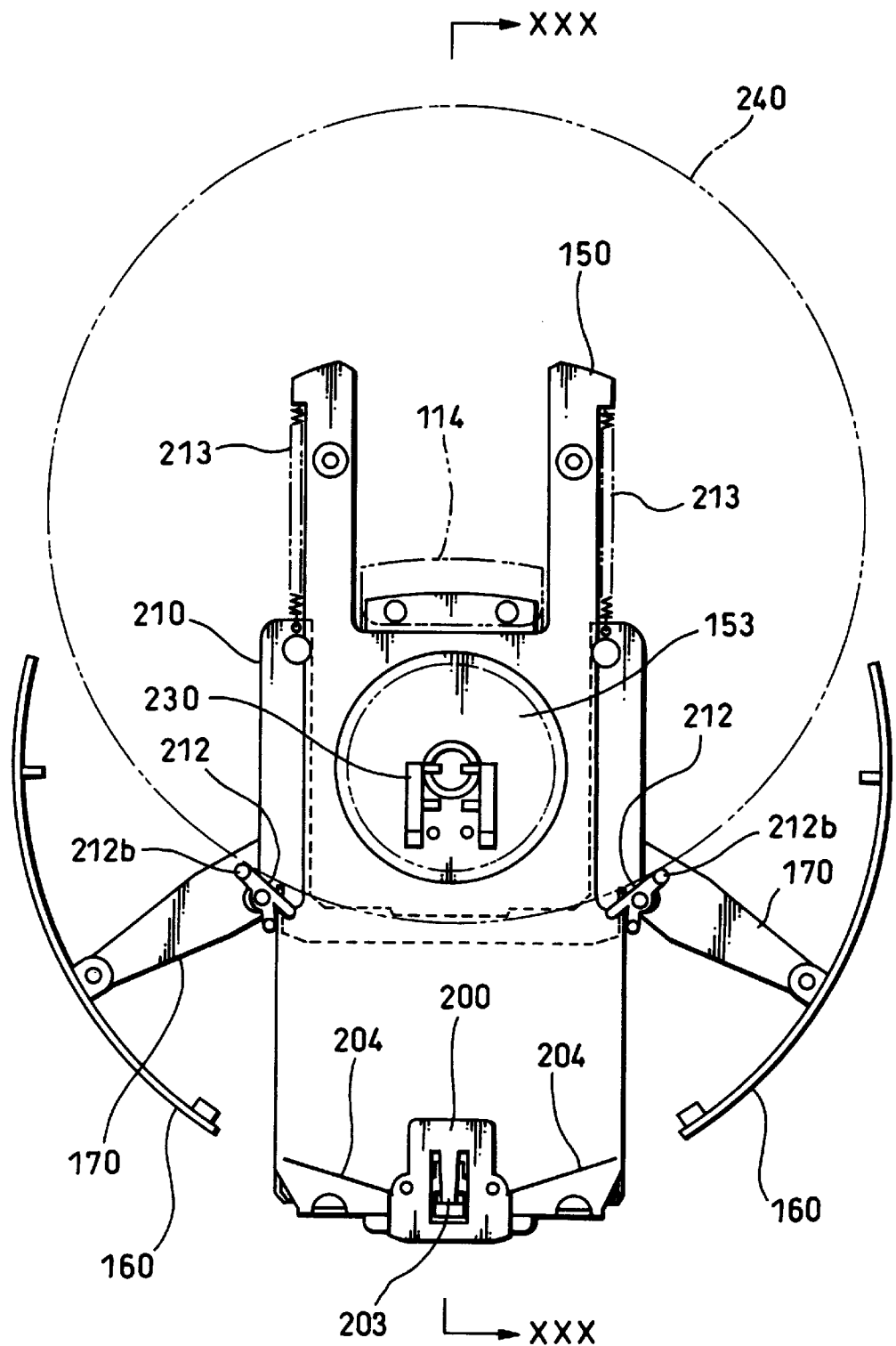
FIG. 28 is a bottom view showing the mechanism portion in such a state that the disc comes into contact with a disc stopper supported by an eject lever.

In this way, when the disc 240 is inserted into the main body portion 110, as shown in FIGS. 28 and 30, the outer peripheral edge of the front end of the disc 240 on the insertion side thus comes into contact with the front ends of the contact pieces 212b and 212b of the disc stoppers 212 and 212 supported by the eject lever 210, and presses the disc stoppers 212, 212 and the eject lever 210 backward.

Against the moving force applied by the tension springs 213 and 213, therefore, the eject lever 210 is moved backward. If the eject lever 210 arrives at the rear end of its moving range, i.e., the stand-by position shown in FIG. 29, then the locked pieces 211 and 211 of the eject lever 210 engage with the lock claws 193a and 193a of the lock lever 190 as described above, and the eject lever 210 is locked at the stand-by position shown in FIG. 29. In such a process that the locked pieces 211 and 211 engage with the lock claws 193a and 193a, the locked pieces 211 and 211 press the inclined faces 193b and 193b of the lock claws 193a and 193a and rotate the lock lever 190 so as to make it rise forward. As a result, engagement of the lock claw 192a located in the center of the lock lever 190 with the locked hole 186a is released. The eject slider 180 is thus moved forward by the force applied by the tension springs 183 and 183 as shown in FIG. 28.

If the eject lever 210 moves to the rear end of its moving range, then the rear end portions of the projection pieces 212c and 212c of the disc stoppers 212 and 212 fall off the side edges of the eject slider 180. In addition, since the side spring pieces 204 and 204 of the lock lever spring 200 elastically come in contact with the elastically contacted pieces 212d and 212d from the back, as shown in FIG. 29, the contact pieces 212d and 212d rotate so as to open outward, and the front end portions of the disc stoppers 212, 212 are thus separated from the outer peripheral edge of the disc 240.

Since the eject slider 180 moves forward, the shutters 160 and 160, the chassis covers 140L and 140R, and the chucking plate 220 move in directions opposite to them in the foregoing description. In other words, the shutters 160 and 160 move to the closing positions to close the disc insertion portion 113, the chassis covers 140L and 140R rotate downward, and the chucking plate 220 moves downward.

Since the chassis covers 140L and 140R rotate downward, the outer peripheral edges of them move to positions lower than the disc mounting face of the disc table 130. As a result, the disc 240 moves downward and it is placed on the disc table 130. At the same time, a central hole 241 of the disc 240 is fitted around the positioning projection 131 of the disc table 130. Concurrently therewith, the chucking plate 220 moves downward. Accordingly, the chucking plate 220 is absorbed by the magnet 132 of the disc table 130 and as shown in FIG. 31, the disc 240 is held between the disc table 130 and the chucking plate 220. In other words, the disc 240 is chucked.

In such a state that the disc 240 is chucked, the disc table 130 is rotated by the motor not shown as described above. As a result, the disc 240 is rotated together with the disc table 130 and the chucking plate 220. By an optical pickup which moves in the radial direction of the disc 240 and which is not illustrated, the data recorded on the disc 240 is read out. By subjecting the read data to signal processing, the data recorded on the disc 240 is reproduced.

When the reproduction of the disc 240 is finished and the DISC 240 is to be taken out from the disc player 100, i.e., the disc is to be ejected, the rotation of the disc table 130 is stopped by operating the operation unit, not shown, of the disc player 100 and then the eject handle 114 is moved backward similar to that mentioned before.

Since the eject handle 114 is moved backward, the eject slider 180 is moved backward. As described above, the shutters 160 and 160 are moved to the open positions to open the disc insertion portion 113, the chassis covers 140L and 140R are rotated upward, and further the chucking plate 220 is pulled up upward. By lifting up the chucking plate 220, chucking of the disc 240 is released. In addition, the disc 240 is lifted upward by the chassis covers 140L and 140R, and floated upward from mounting surface of the disc table 130.

When the eject slider 180 has arrived at the rear end of its moving range, the lock claw 192a of the lock lever 190 engages with the locked hole 186a thereof and the eject slider 180 is locked at the rear end position of its moving range. Immediately before the locked hole 186a is locked by the lock claw 192a, the locked piece 186 of the eject slider 180 presses the inclined face 192b of the lock claw 182a and rotates the lock lever 190 so as to rise forward. As a result, the engagement of the lock claws 193a and 193a with the locked pieces 211 and 211 of the eject lever 210 is released. The locking of the eject lever 210 at the stand-by position is thus released. As a result, the eject lever 210 is moved to the front end of its moving range, i.e., the eject position by the tension coil springs 213 and 213.

By the movement of the eject lever 210 from the stand-by position shown in FIG. 29 to the eject position shown in FIGS. 28 and 30, the contact pieces 212b and 212b of the disc stoppers 212 and 212 press the outer peripheral edge of the disc 240 and projects a part of the disc 240 from the disc insertion portion 113. Therefore, it is possible for the user to grasp the part of the disc 240 projected from the disc insertion portion 113 by his finger and pull out the disc 240 to the outside of the disc player 100.

In each of the foregoing embodiments, the present invention is applied to a disc player. However, the application range of the present invention is not limited to disc players, but the present invention can be widely applied to apparatuses intended for conducting both reproduction and recording of a disc-shaped recording medium, and for conducting the recording alone. In addition, the disc-shape recording medium is not limited to a so-called compact disc, but the present invention can be applied to loading apparatuses using various disc-shaped recording media such as a disc -R, a disc -ROM, a DVD, a LD and so on.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A recording and/or reproducing apparatus of a recording medium, comprising:

a main body portion having an opening portion through which a recording medium is inserted or ejected;

a shutter mechanism for opening and closing said opening portion, said shutter mechanism being provided on said main body portion to be freely movable and for automatically closing said opening portion under a state that said recording medium is completely inserted into said main body portion;

a drive mechanism for driving said recording medium;

an elevator mechanism, said elevator mechanism including a chucking mechanism and a chassis cover, said elevator mechanism moved up and down in an interlocking manner with a movement of said shutter mechanism, said elevator mechanism mounting the recording medium on said drive mechanism when said shutter mechanism is moved to a position to close said opening portion, and moving said recording medium apart from said drive mechanism when said shutter mechanism is moved to a position to open said opening portion; and an eject mechanism for ejecting a recording medium from said opening portion, said eject mechanism interlocked with said shutter mechanism such that the recording medium is ejected from said opening portion when the recording medium is moved from said drive mechanism by said elevator mechanism when said shutter mechanism is moved from the position to close said opening portion to the position to open said opening portion.

2. The recording and/or reproducing apparatus of a recording medium according to claim 1, further comprising an operation unit, the operation unit including drive levers, for moving said shutter mechanism from the position to close said opening portion to the position to open said opening portion.

3. The recording and/or reproducing apparatus of a recording medium as claimed in claim 2, wherein said operation unit is provided on said main body portion to be freely movable, and when said operation unit is moved to a first position, said shutter mechanism is moved to the position to open said opening portion, and when said operation unit is moved to a second position, said shutter mechanism is moved to the position to close said opening portion.

4. The recording and/or reproducing apparatus of a recording medium as claimed in claim 3, wherein said eject mechanism is provided with an eject operation unit for ejecting a recording medium, and said eject operation unit is moved away from a standby position to eject the recording medium from said opening portion by the recording medium inserted through said opening portion.

5. The recording and/or reproducing apparatus of a recording medium as claimed in claim 4, wherein said eject mechanism is provided with a retaining mechanism to retain said eject operation unit at said standby position.

6. The recording and/or reproducing apparatus of a recording medium as claimed in claim 5, wherein said retaining mechanism releases the retaining of said eject operation unit when said operation unit is moved to said first position, and a recording medium is ejected from said opening portion.

7. A recording and/or reproducing apparatus of a disc-shaped recording medium, comprising:
- a main body portion having an opening portion through which a disc-shaped recording medium is inserted or ejected;
- a shutter mechanism for opening and closing said opening portion, said shutter mechanism being provided in said main body portion to be freely movable and for automatically closing said opening portion under a state that said disc-shaped recording medium is completely inserted into said main body portion;
- a drive mechanism for rotatably driving said disc-shaped recording medium, said drive mechanism including a disc table on which the disc-shaped recording medium is mounted and a motor to rotate said disc table;
- an elevator mechanism, said elevator mechanism including a chucking mechanism and a chassis cover, said elevator mechanism moved up and down in an interlocking manner with a movement of said shutter mechanism, said elevator moving to a position lower than said disc table to mount the recording medium on said disc table when said shutter mechanism is moved to a position to close said opening portion, and lifting up said disc-shaped recording medium from said disc table when said shutter mechanism is moved to a position to open said opening portion; and
- an eject mechanism for ejecting a disc-shaped recording medium from said opening portion, said eject mechanism interlocked with said shutter mechanism such that the disc-shaped recording medium is ejected from said opening portion when said disc-shaped recording medium is lifted up from said disc table by said elevator mechanism when said shutter mechanism is moved from the position to close said opening portion to the position to open said opening portion.

8. The recording and/or reproducing apparatus of a disc-shaped recording medium as claimed in claim 7, wherein said drive mechanism further comprises a clamper member for gripping a disc-shaped recording medium with said disc table, and said clamper member is located at a portion above said disc table under a state that said opening portion is opened, and said clamper member is moved down from the portion above said table to a lower position to grip the disc-shaped recording medium with said disc table under a state that said opening portion is closed and the disc-shaped recording medium is mounted on said disc table.

9. The recording and/or reproducing apparatus of a disc-shaped recording medium according to claim 8, further comprising an operation unit, the operation unit including drive levers, for moving said shutter mechanism from the position to close said opening portion to the position to open said opening portion.

10. The recording and/or reproducing apparatus of a disc-shaped recording medium as claimed in claim 9, wherein said operation unit is provided on said main body portion to be freely movable, and when said operation unit is moved to a first position, said shutter mechanism is moved to the position to open said opening portion, and when said operation unit is moved to a second position, said shutter mechanism is moved to the position to close said opening portion.

11. The recording and/or reproducing apparatus of a disc-shaped recording medium as claimed in claim 10, wherein said eject mechanism is provided with an eject operation unit for ejecting a disc-shaped recording medium, and said eject operation unit is moved away from a standby position to eject the disc-shaped recording medium from said opening portion by the disc-shaped recording medium inserted through said opening portion.

12. The recording and/or reproducing apparatus of a disc-shaped recording medium as claimed in claim 11, wherein said eject mechanism is provided with a retaining mechanism to retain said eject operation unit at said standby position.

13. The recording and/or reproducing apparatus of a disc-shaped recording medium as claimed in claim 12, wherein said retaining mechanism releases the retaining of said eject operation unit when said operation unit is moved to said first position, and a disc-shaped recording medium is ejected from said opening portion.

14. The recording and/or reproducing apparatus of a disc-shaped recording medium as claimed in claim 9, wherein said clamper member is moved to the portion above said disc table when said operation unit is moved to said first position and said clamper member is moved to the lower position when said operation unit is moved to said second position.

15. The recording and/or reproducing apparatus of a disc-shaped recording medium according to claim 14, further comprising an elevation operation mechanism for moving said clamper member between the portion above said disc table and said lower position when said operation unit is moved between said first position and said second position.

16. A recording and/or reproducing apparatus of a recording medium, comprising:
- a main body portion having an opening portion through which a recording medium is inserted or ejected, said opening portion being formed through a side surface of said main body portion;
- a shutter mechanism for opening and closing said opening portion, said shutter mechanism being provided to be freely movable along a side surface of said main body portion and for automatically closing said opening portion under a state that said recording medium is completely inserted into said main body portion, said shutter mechanism including at least two shutter members, said at least two shutter members being moved between a position to open said opening portion and a position to close said opening portion, said at least two shutter members opening said opening portion when being moved in opposite directions with each other, and closing said opening portion when being moved in a direction in which said at least two shutter members approach each other;

a drive mechanism for driving said recording medium;

an elevator mechanism, said elevator mechanism including a chucking mechanism and a chassis cover, said elevator mechanism moved up and down in an interlocking manner with a movement of said at least two shutter members, said elevator mechanism mounting the recording medium on said drive mechanism when said at least two shutter members are moved to a position to close said opening portion, and moving said recording medium apart from said drive mechanism when said at least two shutter members are moved to a position to open said opening portion; and an eject mechanism for ejecting a recording medium from said opening portion, said eject mechanism interlocked with said shutter mechanism such that the recording medium is ejected from said opening portion when said recording medium is moved apart from said drive mechanism by said elevator mechanism when said at least two shutter members are moved from the position to close said opening portion to the position to open said opening portion.

17. The recording and/or reproducing apparatus of a recording medium according to claim 16, further comprising an operation unit, the operation unit including engagement pins, for moving said at least two shutter members from the position to close said opening portion to the position to open said opening portion.

18. The recording and/or reproducing apparatus of a recording medium as claimed in claim 17, wherein said operation unit is provided on said main body portion to be freely movable, and when said operation unit is moved to a first position, said at least two shutter members are moved to the position to open said opening portion, and when said operation unit is moved to a second position, said at least two shutter members are moved to the position to close said opening portion.

19. The recording and/or reproducing apparatus of a recording medium as claimed in claim 18, wherein said eject mechanism is provided with an eject operation unit for ejecting a recording medium, and said eject operation unit is moved away from a standby position to eject the recording medium from said opening portion by the recording medium inserted through said opening portion.

20. The recording and/or reproducing apparatus of a recording medium as claimed in claim 19, wherein said eject mechanism is provided with a retaining mechanism to retain said eject operation unit at said standby position.

21. The recording and/or reproducing apparatus of a recording medium as claimed in claim 20, wherein said retaining mechanism releases the retaining of said eject operation unit when said operation unit is moved to said first position, and a recording medium is ejected from said opening portion.

* * * * *